United States Patent
Thomas et al.

(10) Patent No.: US 10,463,222 B2
(45) Date of Patent: Nov. 5, 2019

(54) NONWOVEN TACK CLOTH FOR WIPE APPLICATIONS

(71) Applicant: Kimberly-Clark Worldwide, Inc., Neenah, WI (US)

(72) Inventors: Oomman P. Thomas, Alpharetta, GA (US); Balaji Kovil Kandadai, Cumming, GA (US); Timothy W. Reader, Suwanee, GA (US); Bryon P. Day, Canton, GA (US); Luke McCullen, Atlanta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 306 days.

(21) Appl. No.: 14/091,454

(22) Filed: Nov. 27, 2013

(65) Prior Publication Data

US 2015/0143653 A1    May 28, 2015

(51) Int. Cl.
*A47L 13/16* (2006.01)
*D04H 1/4291* (2012.01)
(Continued)

(52) U.S. Cl.
CPC .............. *A47L 13/16* (2013.01); *A47L 13/18* (2013.01); *D04H 1/4291* (2013.01); *D04H 1/492* (2013.01); *D04H 1/54* (2013.01); *D04H 1/541* (2013.01); *D04H 3/007* (2013.01); *D04H 3/11* (2013.01); *D04H 3/147* (2013.01); *D04H 3/16* (2013.01); *B29C 48/05* (2019.02);
(Continued)

(58) Field of Classification Search
None
See application file for complete search history.

(56) References Cited

U.S. PATENT DOCUMENTS 3,028,618 A    4/1962  Lyman
3,338,992 A    8/1967  Kinney
(Continued)

FOREIGN PATENT DOCUMENTS

EP    0 829 222 B1    8/2002
JP    H09-105056 A    4/1997
(Continued)

OTHER PUBLICATIONS

International Search Report and Written Opinion for PCT/IB2014/064971 dated Jan. 29, 2015, 13 pages.
(Continued)

*Primary Examiner* — Shawn Mckinnon
(74) *Attorney, Agent, or Firm* — Dority & Manning, P.A.

(57) ABSTRACT

A nonwoven web material that contains fibers formed by compounding at least one polymer with a tackifier is provided. The nonwoven web material can be used as a wipe or tack cloth and can exhibit a dust holding capacity of at least about 10 grams/m$^2$ and a lint potential of less than about 5 fibers/cm$^2$. In addition to containing a tackifier that is compounded with the polymer(s) used to form the fibers of the web, the nonwoven web material can be textured, post-bonded, apertured, or treated with elemental fluorine gas to further improve its dust holding capacity and minimize lint production. In addition, the nonwoven web material leaves minimal residue after contacting a surface.

8 Claims, 11 Drawing Sheets

(51) Int. Cl.
*B29C 47/00* (2006.01)
*A47L 13/18* (2006.01)
*D04H 1/492* (2012.01)
*D04H 3/007* (2012.01)
*D04H 3/11* (2012.01)
*D04H 3/16* (2006.01)
*D04H 1/54* (2012.01)
*D04H 1/541* (2012.01)
*D04H 3/147* (2012.01)
*B29L 7/00* (2006.01)
*B29C 48/05* (2019.01)

(52) U.S. Cl.
CPC ... *B29L 2007/008* (2013.01); *D10B 2321/021* (2013.01); *D10B 2321/022* (2013.01)

(56) References Cited

U.S. PATENT DOCUMENTS

| | | | |
|---|---|---|---|
| 3,341,394 A | 9/1967 | Kinney | |
| 3,494,821 A | 2/1970 | Evans | |
| 3,502,538 A | 3/1970 | Petersen | |
| 3,502,763 A | 3/1970 | Hartmann | |
| 3,542,615 A | 11/1970 | Dobo et al. | |
| 3,658,578 A | 4/1972 | Bennett | |
| 3,692,618 A | 9/1972 | Dorschner et al. | |
| 3,802,817 A | 4/1974 | Matsuki et al. | |
| 3,844,869 A | 10/1974 | Rust, Jr. | |
| 3,849,241 A | 11/1974 | Butin et al. | |
| 3,855,046 A | 12/1974 | Hansen et al. | |
| 3,939,033 A | 2/1976 | Grgach et al. | |
| 4,100,324 A | 7/1978 | Anderson et al. | |
| 4,144,370 A | 3/1979 | Boulton | |
| 4,259,399 A | 3/1981 | Hill | |
| 4,340,563 A | 7/1982 | Appel et al. | |
| 4,707,398 A | 11/1987 | Boggs | |
| 4,789,592 A | 12/1988 | Taniguchi et al. | |
| 4,795,668 A | 1/1989 | Krueger et al. | |
| 5,057,368 A | 10/1991 | Largman et al. | |
| 5,069,970 A | 12/1991 | Largman et al. | |
| 5,096,532 A | 3/1992 | Neuwirth et al. | |
| 5,108,820 A | 4/1992 | Kaneko et al. | |
| 5,110,403 A | 5/1992 | Ehlert | |
| 5,162,074 A | 11/1992 | Hills | |
| 5,198,292 A | 3/1993 | Lerner et al. | |
| 5,198,293 A | 3/1993 | Metrick | |
| 5,218,071 A | 6/1993 | Tsutsui et al. | |
| 5,272,236 A | 12/1993 | Lai et al. | |
| 5,277,976 A | 1/1994 | Hogle et al. | |
| 5,278,272 A | 1/1994 | Lai et al. | |
| 5,284,703 A | 2/1994 | Everhart et al. | |
| 5,322,728 A | 6/1994 | Davey et al. | |
| 5,332,613 A | 7/1994 | Taylor et al. | |
| 5,336,552 A | 8/1994 | Strack et al. | |
| 5,350,624 A | 9/1994 | Georger et al. | |
| 5,382,400 A | 1/1995 | Pike et al. | |
| 5,417,121 A * | 5/1995 | Andersen | G01N 35/1002 220/521 |
| 5,425,987 A * | 6/1995 | Shawver | D04H 1/5405 428/198 |
| 5,466,410 A | 11/1995 | Hills | |
| 5,472,775 A | 12/1995 | Obijeski et al. | |
| 5,539,056 A | 7/1996 | Yang et al. | |
| D375,844 S | 11/1996 | Edwards et al. | |
| 5,571,619 A | 11/1996 | McAlpin et al. | |
| 5,596,052 A | 1/1997 | Resconi et al. | |
| 5,620,779 A | 4/1997 | Levy et al. | |
| D390,708 S | 2/1998 | Brown | |
| 5,817,199 A | 10/1998 | Brennecke et al. | |
| 5,962,112 A | 10/1999 | Haynes et al. | |
| 5,964,742 A | 10/1999 | McCormack et al. | |
| D428,267 S | 7/2000 | Romano, III et al. | |
| 6,090,325 A | 7/2000 | Wheat et al. | |
| 6,093,665 A | 7/2000 | Sayovitz et al. | |
| 6,200,669 B1 | 3/2001 | Marmon et al. | |
| 6,207,227 B1 | 3/2001 | Russo et al. | |
| 6,225,243 B1 * | 5/2001 | Austin | D01F 8/06 442/328 |
| 6,500,563 B1 | 12/2002 | Datta et al. | |
| 6,550,092 B1 | 4/2003 | Brown et al. | |
| D487,353 S | 3/2004 | Wolf | |
| 6,746,974 B1 | 6/2004 | Reiterer et al. | |
| 6,808,791 B2 | 10/2004 | Curro et al. | |
| 7,560,398 B2 | 7/2009 | Zillig et al. | |
| 7,779,521 B2 | 8/2010 | Topolkaraev et al. | |
| 7,976,662 B2 | 7/2011 | Thomas et al. | |
| 8,337,626 B2 | 12/2012 | Simandl et al. | |
| 2002/0042962 A1 | 4/2002 | Willman et al. | |
| 2002/0144384 A1 * | 10/2002 | Maugans | D04H 3/14 28/116 |
| 2002/0164465 A1 * | 11/2002 | Curro | A47L 1/15 428/198 |
| 2005/0064186 A1 * | 3/2005 | Lin | D01F 6/46 428/364 |
| 2005/0148261 A1 | 7/2005 | Close et al. | |
| 2005/0215144 A1 | 9/2005 | Ellis | |
| 2006/0135012 A1 | 6/2006 | Laker et al. | |
| 2006/0240223 A1 | 10/2006 | Tuman et al. | |
| 2007/0141930 A1 * | 6/2007 | Thomas | B32B 27/12 442/59 |
| 2007/0173162 A1 * | 7/2007 | Ethiopia | C08L 23/10 442/327 |
| 2009/0042472 A1 * | 2/2009 | Poon | C08F 210/16 442/182 |
| 2009/0076216 A1 * | 3/2009 | Kiss | C08F 10/00 524/579 |
| 2009/0270824 A1 | 10/2009 | Kapik et al. | |
| 2010/0044909 A1 | 2/2010 | Haskett et al. | |

FOREIGN PATENT DOCUMENTS

| | | |
|---|---|---|
| WO | WO 98/10692 A1 | 3/1998 |
| WO | WO 00/29655 | 5/2000 |
| WO | WO 00/38565 A1 | 7/2000 |
| WO | WO 00/53411 A1 | 9/2000 |
| WO | WO 2005/111282 A1 | 11/2005 |
| WO | WO 2007/140163 A2 | 12/2007 |
| WO | WO 2008/068658 A2 | 6/2008 |
| WO | WO 2008/068658 A3 | 6/2008 |
| WO | WO 2009/078479 A1 | 6/2009 |
| WO | WO 2009/111185 A2 | 9/2009 |

OTHER PUBLICATIONS

Supplementary European Search Report for Application No. 14866546.6 (3074112), dated May 29, 2017, 8 pages.

* cited by examiner

NONWOVEN TACK CLOTH FOR WIPE APPLICATIONS

BACKGROUND OF THE INVENTION

Nonwoven tack cloths or wipes are used in various industries for trapping dust, dirt, pathogens, and other foreign particulates. For instance, in the automotive and aviation industries, tack cloths are used during painting to pick up foreign particulates from the surfaces being painted, and it is important that no residue or lint is left behind on the surface so that the painted surfaces have a smooth, even finish. For instance, if residue from the tack cloth is left on the wiped surface, the tackiness of the residue can attract particulates, which can create imperfections in the paint finish. It is also important that no residue is left on the hands of the user of the tack cloth, as such residue could be transferred to other surfaces and cause further imperfections on those surfaces. Tack cloths are also used in hospital settings such as operating rooms, where it is important that pathogens trapped by the tack cloth remain trapped to reduce the likelihood that such pathogens could be introduced to the patient via an open wound or body cavity. Further, it is critical that particulates or lint from the cloth itself not be discharged during use, as such particulates or lint can also be introduced to an open wound or body cavity, resulting in infection or inflammation. Such traits are also desirable in wipes used in any clean room environment, whether it be in the healthcare, pharmaceutical, or semiconductor industries, where environmental monitoring requires that air particulate counts be kept below a minimal level based on the clean room class rating.

Various attempts have been made at producing tack cloths having high particulate holding capacity that when, after use, leave minimal lint and/or residue on the surface on which they were used. For instance, tack cloths have been produced that utilize a tackifier, where a nonwoven material is made and then treated with a tackifier, such as by coating, spraying, or dipping/squeezing methods where the tackifier is in solution form. However, such methods of incorporating a tackifier into a nonwoven web material or wipe can limit the points of contact between the fibers of the nonwoven web material and the tackifier, and it is difficult to ensure that the tackifier has been coated uniformly on the nonwoven web material fibers, which can reduce the dust holding capacity of the tack cloth. In addition, when the tackifier or adhesive is coated on the wipe, the coating can transfer to the user's hands during use such that the user's hands are covered with a sticky residue, which is undesirable because the residue can be transferred to surfaces touched by the user and can also be uncomfortable to the user. Further, using a tackifier in coating form can increase the stiffness of the nonwoven web material.

As such, what is needed is a nonwoven web material that can be used as a wipe or tack cloth, where the tackifier is uniformly dispersed to increase the amount of particulates that can be trapped by the wipe or tack cloth. What is also needed is a wipe or tack cloth that emits low levels of lint and that does not leave a residue or streaks on a surface after the surface has been wiped or cleaned.

SUMMARY OF THE INVENTION

In accordance with one embodiment of the present invention, a nonwoven web material is disclosed. The nonwoven web material includes fibers that include a first polymer and a second polymer. The first polymer includes an olefin homopolymer and the second polymer includes an olefin-based plastomer having a glass transition temperature of less than about 25° C. The nonwoven web material has a dust holding capacity of from about 10 grams/m$^2$ to about 130 grams/m$^2$, and the amount of residue present on a surface wiped with the nonwoven web material ranges from about 0 grams/m$^2$ to about 0.02 grams/m$^2$.

In accordance with another embodiment of the present invention, a method of forming a tack cloth that includes a nonwoven web material is disclosed. The method includes compounding a first polymer and a second polymer, where the first polymer includes an olefin homopolymer and the second polymer includes an olefin-based plastomer having a glass transition temperature of less than about 25° C., to form a first polymer blend; forming fibers from the first polymer blend; and collecting the fibers onto a foraminous surface to form the nonwoven web material; where the nonwoven web material exhibits a dust holding capacity of from about 10 grams/m$^2$ to about 130 grams/m$^2$.

Other features and aspects of the present invention are described in more detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
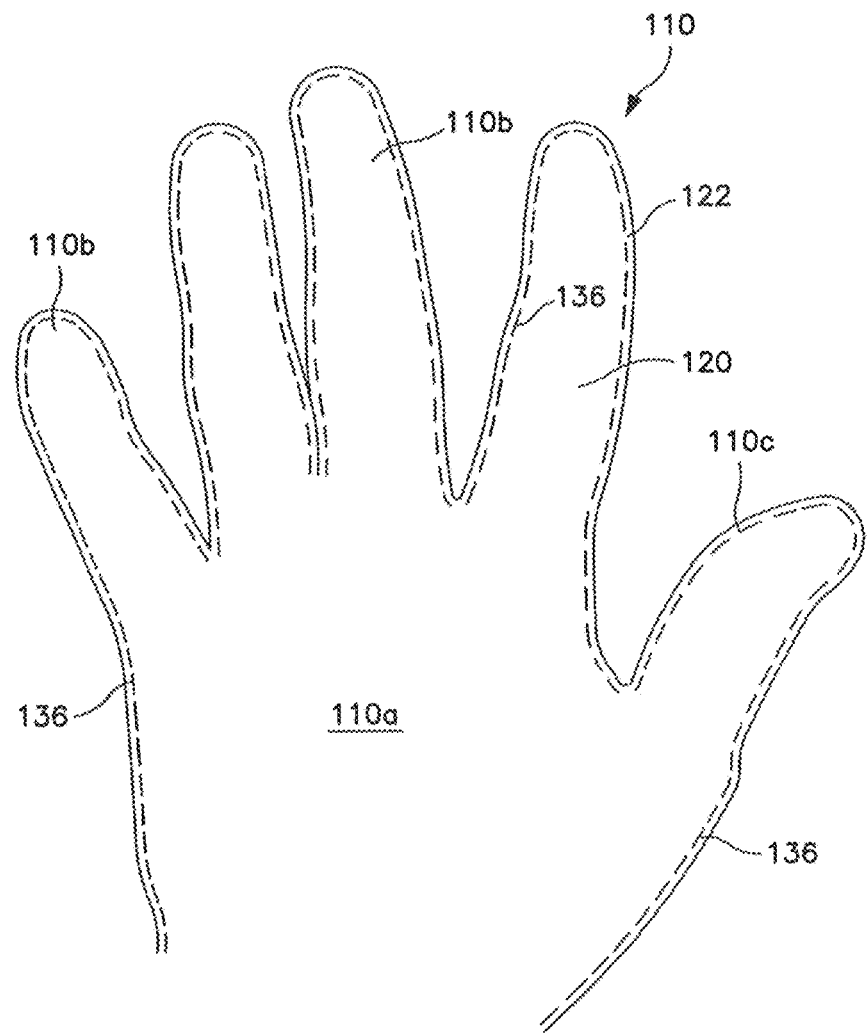
FIG. 1 illustrates one example of a nonwoven tack cloth in accordance with the present invention, where the tack cloth is in the form of a glove.

Repeat use of reference characters in the present specification and drawings is intended to represent same or analogous features or elements of the invention.

DETAILED DESCRIPTION OF REPRESENTATIVE EMBODIMENTS

Definitions

As used herein the term "nonwoven web" generally refers to a web having a structure of individual fibers or threads which are interlaid, but not in an identifiable manner as in a knitted fabric. Examples of suitable nonwoven fabrics or webs include, but are not limited to, meltblown webs, spunbond webs, bonded carded webs, airlaid webs, coform webs, hydraulically entangled webs, and so forth.

As used herein, the term "meltblown web" generally refers to a nonwoven web that is formed by a process in which a molten thermoplastic material is extruded through a plurality of fine, usually circular, die capillaries as molten fibers into converging high velocity gas (e.g., air) streams that attenuate the fibers of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin, et al., which is incorporated herein in its entirety by reference thereto for all purposes. Generally speaking, meltblown fibers may be microfibers that are substantially continuous or discontinuous, generally smaller than 10 microns in diameter, and generally tacky when deposited onto a collecting surface.

As used herein, the term "spunbond web" generally refers to a web containing small diameter substantially continuous fibers. The fibers are formed by extruding a molten thermoplastic material from a plurality of fine, usually circular, capillaries of a spinnerette with the diameter of the extruded fibers then being rapidly reduced as by, for example, eductive drawing and/or other well-known spunbonding mechanisms. The production of spunbond webs is described and illustrated, for example, in U.S. Pat. No. 4,340,563 to Appel, et al., U.S. Pat. No. 3,692,618 to Dorschner, et al., U.S. Pat. No. 3,802,817 to Matsuki, et al., U.S. Pat. No. 3,338,992 to Kinney, U.S. Pat. No. 3,341,394 to Kinney, U.S. Pat. No. 3,502,763 to Hartman, U.S. Pat. No. 3,502,538 to Levy, U.S. Pat. No. 3,542,615 to Dobo, et al. and U.S. Pat. No. 5,382,400 to Pike, et al., which are incorporated herein in their entirety by reference thereto for all purposes. Spunbond fibers are generally not tacky when they are deposited onto a collecting surface. Spunbond fibers may sometimes have diameters less than about 40 microns, and are often between about 5 to about 20 microns.

As used herein, the term "coform" generally refers to composite materials comprising a mixture or stabilized matrix of thermoplastic fibers and a second non-thermoplastic material. As an example, coform materials may be made by a process in which at least one meltblown die head is arranged near a chute through which other materials are added to the web while it is forming. Such other materials may include, but are not limited to, fibrous organic materials such as woody or non-woody pulp such as cotton, rayon, recycled paper, pulp fluff and also superabsorbent particles, inorganic and/or organic absorbent materials, treated polymeric staple fibers and so forth. Some examples of such coform materials are disclosed in U.S. Pat. No. 4,100,324 to Anderson, et al., U.S. Pat. No. 5,284,703 to Everhart et al., and U.S. Pat. No. 5,350,624 to Georger, et al., each of which are incorporated herein in their entirety by reference thereto for all purposes.

As used herein, the term "bonded carded web" refers to webs made from staple fibers which are sent through a combing or carding unit, which breaks apart and aligns the staple fibers in the machine direction to form a generally machine direction-oriented fibrous nonwoven web. Such fibers are usually purchased in bales which are placed in a picker or fiberizer which separates the fibers prior to the carding unit. Once the web is formed, it is then bonded by one or more of several known bonding methods.

As used herein, the terms "machine direction" or "MD" generally refers to the direction in which a material is produced. The term "cross-machine direction" or "CD" refers to the direction perpendicular to the machine direction.

As used herein, the term "elastomeric" and "elastic" and refers to a material that, upon application of a stretching force, is stretchable in at least one direction (such as the CD direction), and which upon release of the stretching force, contracts/returns to approximately its original dimension. For example, a stretched material may have a stretched length that is at least 50% greater than its relaxed unstretched length, and which will recover to within at least 50% of its stretched length upon release of the stretching force. A hypothetical example would be a one (1) inch sample of a material that is stretchable to at least 1.50 inches and which, upon release of the stretching force, will recover to a length of not more than 1.25 inches. Desirably, the material contracts or recovers at least 50%, and even more desirably, at least 80% of the stretched length.

As used herein, the term "thermal point bonding" generally refers to a process performed, for example, by passing a material between a patterned roll (e.g., calendar roll) and another roll (e.g., anvil roll), which may or may not be patterned. One or both of the rolls are typically heated.

As used herein, the term "ultrasonic bonding" generally refers to a process performed, for example, by passing a material between a sonic horn and a patterned roll (e.g., anvil roll). For instance, ultrasonic bonding through the use of a stationary horn and a rotating patterned anvil roll is described in U.S. Pat. No. 3,939,033 to Grgach et al., U.S. Pat. No. 3,844,869 to Rust Jr., and U.S. Pat. No. 4,259,399 to Hill, which are incorporated herein in their entirety by reference thereto for all purposes. Moreover, ultrasonic bonding through the use of a rotary horn with a rotating patterned anvil roll is described in U.S. Pat. No. 5,096,532 to Neuwirth, et al., U.S. Pat. No. 5,110,403 to Ehlert, and U.S. Pat. No. 5,817,199 to Brennecke, et al., which are incorporated herein in their entirety by reference thereto for all purposes. Of course, any other ultrasonic bonding technique may also be used in the present invention.

DETAILED DESCRIPTION

Reference now will be made in detail to various embodiments of the invention, one or more examples of which are set forth below. Each example is provided by way of explanation, not limitation, of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention cover such modifications and variations.

Generally speaking, the present invention is directed to a nonwoven web material that can be used in any wipe or glove application where the wipe or glove is used to clean a surface or remove foreign particulates from a surface. The nonwoven web material can be formed from fibers containing one or more polymers. The fibers can be microfibers, nanofibers, or any other fiber suitable for use in a nonwoven web material. The fibers can also contain a tackifier that, when present, is distributed uniformly throughout the fiber itself rather than being applied to the fiber as a treatment after the nonwoven web material is fabricated. As such, a portion of the tackifier can be present on an exposed surface of each of the fibers in the nonwoven web material to aid in trapping particulates within the nonwoven web material. Further, the nonwoven web material can be textured in various patterns to further aid in trapping particulates in or on the nonwoven web material. Moreover, although the nonwoven web material has improved particulate-holding capabilities, the nonwoven web material leaves no to minimal residue on the surfaces on which it is wiped.

Additionally, the nonwoven web material can be post-bonded to minimize lint production upon use. Concurrent with or independently from the aforementioned bonding, apertures can also be formed in the nonwoven web material. The apertures can be of a size sufficient to trap foreign particulates in the nonwoven web material without having a significant adverse effect on the material's texture, softness, hand, feel, and/or aesthetic properties.

Moreover, to further enhance the tack of the nonwoven web material, the material can be subjected to a fluorination treatment using elemental fluorine gas. Such a treatment results in the formation of a permanent covalent bond between the fluorine and the polymer or polymers used in the nonwoven web material and can change the surface energy, which, in turn, can improve the retention of particulates in the nonwoven web material.

In this regard, various embodiments of the present invention will now be described in more detail.

I. Polymers

Exemplary polymers that can be used in forming the nonwoven web material can include olefins (e.g., polyethylenes and polypropylenes), polyesters (e.g., polybutylene terephthalate, polybutylene naphthalate), polyamides (e.g., nylons), polycarbonates, polyphenylene sulfides, polystyrenes, polyurethanes (e.g., thermoplastic polyurethanes), etc. In one particular embodiment, the fibers of the nonwoven web material can include an olefin homopolymer. One suitable olefin homopolymer is a propylene homopolymer having a density of 0.91 grams per cubic centimeter (g/cm$^3$), a melt flow rate of 1200 g/10 minute (230° C., 2.16 kg), a crystallization temperature of 113° C., and a melting temperature of 156° C., and is available as METOCENE MF650X polymer from LyondellBasell Industries in Rotterdam, The Netherlands. Another suitable propylene homopolymer that can be used has a density of 0.905 g/cm$^3$, a melt flow rate of 1300 g/10 minute (230° C., 2.16 kg), and a melting temperature of 165° C., and is available as Polypropylene 3962 from Total Petrochemicals in Houston, Tex. Another suitable polypropylene is available as EXXTRAL™ 3155, available from ExxonMobil Chemical Company of Houston, Tex.

Further, a variety of thermoplastic elastomeric and plastomeric polymers may generally be employed in the nonwoven web material of the present invention, such as elastomeric polyesters, elastomeric polyurethanes, elastomeric polyamides, elastomeric copolymers, elastomeric polyolefins, and so forth. In one particular embodiment, elastomeric semi-crystalline polyolefins are employed due to their unique combination of mechanical and elastomeric properties. Semi-crystalline polyolefins have or are capable of exhibiting a substantially regular structure. For example, semi-crystalline polyolefins may be substantially amorphous in their undeformed state, but form crystalline domains upon stretching. The degree of crystallinity of the olefin polymer may be from about 3% to about 60%, in some embodiments from about 5% to about 45%, in some embodiments from about 5% to about 30%, and in some embodiments, from about 5% and about 15%. Likewise, the semi-crystalline polyolefin may have a latent heat of fusion ($\Delta H_f$), which is another indicator of the degree of crystallinity, of from about 15 to about 210 Joules per gram ("J/g"), in some embodiments from about 20 to about 100 J/g, in some embodiments from about 20 to about 65 J/g, and in some embodiments, from 25 to about 50 J/g. The semi-crystalline polyolefin may also have a Vicat softening temperature of from about 10° C. to about 100° C., in some embodiments from about 20° C. to about 80° C., and in some embodiments, from about 30° C. to about 60° C. The semi-crystalline polyolefin may have a melting temperature of from about 20° C. to about 120° C., in some embodiments from about 35° C. to about 90° C., and in some embodiments, from about 40° C. to about 80° C. The latent heat of fusion ($\Delta H_f$) and melting temperature may be determined using differential scanning calorimetry ("DSC") in accordance with ASTM D-3417 as is well known to those skilled in the art. The Vicat softening temperature may be determined in accordance with ASTM D-1525.

Exemplary semi-crystalline polyolefins include polyethylene, polypropylene, as well as their blends and copolymers thereof. In one particular embodiment, a polyethylene is employed that is a copolymer of ethylene and an α-olefin, such as a $C_3$-$C_{20}$ α-olefin or $C_3$-$C_{12}$ α-olefin. Suitable α-olefins may be linear or branched (e.g., one or more $C_1$-$C_3$ alkyl branches, or an aryl group). Specific examples include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are 1-butene, 1-hexene, and 1-octene. The ethylene content of such copolymers may be from about 60 mole % to about 99 mole %, in some embodiments from about 80 mole % to about 98.5 mole %, and in some embodiments, from about 87 mole % to about 97.5 mole %. The α-olefin content may likewise range from about 1 mole % to about 40 mole %, in some embodiments from about 1.5 mole % to about 15 mole %, and in some embodiments, from about 2.5 mole % to about 13 mole %.

The density of the polyethylene may vary depending on the type of polymer employed, but generally ranges from about 0.85 g/cm$^3$ to about 0.96 g/cm$^3$. Polyethylene "plastomers", for instance, may have a density in the range of from 0.85 g/cm$^3$ to 0.91 g/cm$^3$. Likewise, "linear low density polyethylene" ("LLDPE") may have a density in the range of from about 0.91 g/cm$^3$ to about 0.94 g/cm$^3$; "low density polyethylene" ("LDPE") may have a density in the range of from about 0.91 g/cm$^3$ to about 0.94 g/cm$^3$; and "high density polyethylene" ("HDPE") may have density in the range of from 0.94 g/cm$^3$ to 0.96 g/cm$^3$. Densities may be measured in accordance with ASTM 1505.

Particularly suitable polyethylene copolymers are those that are "linear" or "substantially linear." The term "substantially linear" means that, in addition to the short chain branches attributable to comonomer incorporation, the ethylene polymer also contains long chain branches in the polymer backbone. "Long chain branching" refers to a chain length of at least 6 carbons. Each long chain branch may have the same comonomer distribution as the polymer backbone and be as long as the polymer backbone to which it is attached. Preferred substantially linear polymers are substituted with from 0.01 long chain branch per 1000 carbons to 1 long chain branch per 1000 carbons, and in some embodiments, from 0.05 long chain branch per 1000 carbons to 1 long chain branch per 1000 carbons. In contrast to the term "substantially linear", the term "linear" means that the polymer lacks measurable or demonstrable long chain branches. That is, the polymer is substituted with an average of less than 0.01 long chain branch per 1000 carbons.

The density of a linear ethylene/α-olefin copolymer is a function of both the length and amount of the α-olefin. That is, the greater the length of the α-olefin and the greater the amount of α-olefin present, the lower the density of the copolymer. Although not necessarily required, linear polyethylene "plastomers" are particularly desirable in that the content of α-olefin short chain branching content is such that the ethylene copolymer exhibits both plastic and elastomeric characteristics—i.e., a "plastomer." Because polymerization with α-olefin comonomers decreases crystallinity and density, the resulting plastomer normally has a density lower than that of polyethylene thermoplastic polymers (e.g., LLDPE), but approaching and/or overlapping that of an elastomer. For example, the density of the polyethylene plastomer may be 0.91 $g/cm^3$ or less, in some embodiments, from about 0.85 $g/cm^3$ to about 0.88 $g/cm^3$, and in some embodiments, from about 0.85 $g/cm^3$ to about 0.87 $g/cm^3$. Despite having a density similar to elastomers, plastomers generally exhibit a higher degree of crystallinity and may be formed into pellets that are non-adhesive and relatively free flowing.

The distribution of the α-olefin comonomer within a polyethylene plastomer is typically random and uniform among the differing molecular weight fractions forming the ethylene copolymer. This uniformity of comonomer distribution within the plastomer may be expressed as a comonomer distribution breadth index value ("CDBI") of 60 or more, in some embodiments 80 or more, and in some embodiments, 90 or more. Further, the polyethylene plastomer may be characterized by a DSC melting point curve that exhibits the occurrence of a single melting point peak occurring in the region of 50 to 110° C. (second melt rundown).

Preferred plastomers for use in the present invention are ethylene-based copolymer plastomers available under the designation EXACT™ from ExxonMobil Chemical Company of Houston, Tex. Other suitable polyethylene-based plastomers are available under the designation ENGAGE™ and AFFINITY™ from Dow Chemical Company of Midland, Mich. An additional suitable polyethylene-based plastomer is an olefin block copolymer available from Dow Chemical Company of Midland, Mich. under the trade designation INFUSE™, such as INFUSE™ 9807. A polyethylene that can be used in the fibers of the present invention is DOW™ 61800.41. Still other suitable ethylene polymers are available from The Dow Chemical Company under the designations DOWLEX™ (LLDPE), ASPUN™ (LLDPE), and ATTANE™ (ULDPE). Other suitable ethylene polymers are described in U.S. Pat. No. 4,937,299 to Ewen et al.; U.S. Pat. No. 5,218,071 to Tsutsui et al.; U.S. Pat. No. 5,272,236 to Lai, et al.; and U.S. Pat. No. 5,278,272 to Lai et al., which are incorporated herein in their entirety by reference thereto for all purposes.

Of course, the present invention is by no means limited to the use of ethylene polymers. For instance, propylene polymers may also be suitable for use as a semi-crystalline polyolefin. Suitable plastomeric propylene polymers may include, for instance, copolymers or terpolymers of propylene include copolymers of propylene with an α-olefin (e.g., $C_3$-$C_{20}$), such as ethylene, 1-butene, 2-butene, the various pentene isomers, 1-hexene, 1-octene, 1-nonene, 1-decene, 1-unidecene, 1-dodecene, 4-methyl-1-pentene, 4-methyl-1-hexene, 5-methyl-1-hexene, vinylcyclohexene, styrene, etc. The comonomer content of the propylene polymer may be about 35 wt. % or less, in some embodiments from about 1 wt. % to about 20 wt. %, and in some embodiments, from about 2 wt. % to about 10 wt. %. Preferably, the density of the polypropylene (e.g., propylene/α-olefin copolymer) may be 0.91 grams per cubic centimeter ($g/cm^3$) or less, in some embodiments, from 0.85 to 0.88 $g/cm^3$, and in some embodiments, from 0.85 $g/cm^3$ to 0.87 $g/cm^3$. Suitable propylene-based copolymer plastomers are commercially available under the designations VISTAMAXX™ (e.g., 2330, 6202, and 6102), a propylene-ethylene copolymer-based plastomer from ExxonMobil Chemical Co. of Houston, Tex.; FINA™ (e.g., 8573) from Atofina Chemicals of Feluy, Belgium; TAFMER™ available from Mitsui Petrochemical Industries; and VERSIFY™ available from Dow Chemical Co. of Midland, Mich. Other examples of suitable propylene polymers are described in U.S. Pat. No. 6,500,563 to Datta, et al.; U.S. Pat. No. 5,539,056 to Yang, et al.; and U.S. Pat. No. 5,596,052 to Resconi, et al., which are incorporated herein in their entirety by reference thereto for all purposes.

Any of a variety of known techniques may generally be employed to form the semi-crystalline polyolefins. For instance, olefin polymers may be formed using a free radical or a coordination catalyst (e.g., Ziegler-Natta). Preferably, the olefin polymer is formed from a single-site coordination catalyst, such as a metallocene catalyst. Such a catalyst system produces ethylene copolymers in which the comonomer is randomly distributed within a molecular chain and uniformly distributed across the different molecular weight fractions. Metallocene-catalyzed polyolefins are described, for instance, in U.S. Pat. No. 5,571,619 to McAlpin et al.; U.S. Pat. No. 5,322,728 to Davis et al.; U.S. Pat. No. 5,472,775 to Obijeski et al.; U.S. Pat. No. 5,272,236 to Lai et al.; and U.S. Pat. No. 6,090,325 to Wheat, et al., which are incorporated herein in their entirety by reference thereto for all purposes. Examples of metallocene catalysts include bis(n-butylcyclopentadienyl)titanium dichloride, bis(n-butylcyclopentadienyl)zirconium dichloride, bis(cyclopentadienyl)scandium chloride, bis(indenyl)zirconium dichloride, bis(methylcyclopentadienyl)titanium dichloride, bis(methylcyclopentadienyl)zirconium dichloride, cobaltocene, cyclopentadienyltitanium trichloride, ferrocene, hafnocene dichloride, isopropyl(cyclopentadienyl,-1-flourenyl)zirconium dichloride, molybdocene dichloride, nickelocene, niobocene dichloride, ruthenocene, titanocene dichloride, zirconocene chloride hydride, zirconocene dichloride, and so forth. Polymers made using metallocene catalysts typically have a narrow molecular weight range. For instance, metallocene-catalyzed polymers may have polydispersity numbers ($M_w/M_n$) of below 4, controlled short chain branching distribution, and controlled isotacticity.

The melt flow index (MI) of the semi-crystalline polyolefins may generally vary, but is typically in the range of about 0.1 grams per 10 minutes to about 100 grams per 10 minutes, in some embodiments from about 0.5 grams per 10 minutes to about 30 grams per 10 minutes, and in some embodiments, about 1 to about 10 grams per 10 minutes, determined at 190° C. The melt flow index is the weight of the polymer (in grams) that may be forced through an extrusion rheometer orifice (0.0825-inch diameter) when subjected to a force of 5000 grams in 10 minutes at 190° C., and may be determined in accordance with ASTM Test Method D1238-E.

Of course, other thermoplastic polymers may also be used to form nonwoven web material. For instance, a substantially amorphous block copolymer may be employed that has at least two blocks of a monoalkenyl arene polymer separated by at least one block of a saturated conjugated diene polymer. The monoalkenyl arene blocks may include styrene and its analogues and homologues, such as o-methyl styrene; p-methyl styrene; p-tert-butyl styrene; 1,3 dimethyl styrene p-methyl styrene; etc., as well as other monoalkenyl polycyclic aromatic compounds, such as vinyl naphthalene; vinyl anthrycene; and so forth. Preferred monoalkenyl arenes are styrene and p-methyl styrene. The conjugated diene blocks may include homopolymers of conjugated diene monomers, copolymers of two or more conjugated dienes, and copolymers of one or more of the dienes with another monomer in which the blocks are predominantly conjugated diene units. Preferably, the conjugated dienes contain from 4 to 8 carbon atoms, such as 1,3 butadiene (butadiene); 2-methyl-1,3 butadiene; isoprene; 2,3 dimethyl-1,3 butadiene; 1,3 pentadiene (piperylene); 1,3 hexadiene; and so forth.

The amount of monoalkenyl arene (e.g., polystyrene) blocks may vary, but typically constitute from about 8 wt % to about 55 wt %, in some embodiments from about 10 wt. % to about 35 wt. %, and in some embodiments, from about 25 wt. % to about 35 wt. % of the copolymer. Suitable block copolymers may contain monoalkenyl arene endblocks having a number average molecular weight from about 5,000 to about 35,000 and saturated conjugated diene midblocks having a number average molecular weight from about 20,000 to about 170,000. The total number average molecular weight of the block polymer may be from about 30,000 to about 250,000.

Particularly suitable thermoplastic elastomeric block copolymers are available from Kraton Polymers LLC of Houston, Tex. under the trade name KRATON™. KRATON™ polymers include styrene-diene block copolymers, such as styrene-butadiene, styrene-isoprene, styrene-butadiene-styrene, and styrene-isoprene-styrene. KRATON™ polymers also include styrene-olefin block copolymers formed by selective hydrogenation of styrene-diene block copolymers. Examples of such styrene-olefin block copolymers include styrene-(ethylene-butylene), styrene-(ethylene-propylene), styrene-(ethylene-butylene)-styrene, styrene-(ethylene-propylene)-styrene, styrene-(ethylene-butylene)-styrene-(ethylene-butylene), styrene-(ethylene-propylene)-styrene-(ethylene-propylene), and styrene-ethylene-(ethylene-propylene)-styrene. These block copolymers may have a linear, radial or star-shaped molecular configuration. Specific KRATON™ block copolymers include those sold under the brand names G 1652, G 1657, G 1730, MD6673, MD6703, MD6716, and MD6973. Various suitable styrenic block copolymers are described in U.S. Pat. Nos. 4,663,220, 4,323,534, 4,834,738, 5,093,422 and 5,304,599, which are hereby incorporated in their entirety by reference thereto for all purposes. Other commercially available block copolymers include the S-EP-S and S-E-E-P-S elastomeric copolymers available from Kuraray Company, Ltd. of Okayama, Japan, under the trade designation SEPTON™. Still other suitable copolymers include the S-I-S and S-B-S elastomeric copolymers available from Dexco Polymers of Houston, Tex. under the trade designation VECTOR™. Also suitable are polymers composed of an A-B-A-B tetrablock copolymer, such as discussed in U.S. Pat. No. 5,332,613 to Taylor, et al., which is incorporated herein in its entirety by reference thereto for all purposes. An example of such a tetrablock copolymer is a styrene-poly (ethylene-propylene)-styrene-poly(ethylene-propylene) ("S-EP-S-EP") block copolymer.

A single polymer as discussed above can be used to form the fibers from which the nonwoven web material is comprised, and when utilized, can be utilized in amount up to 100 wt. % based on the total weight of the nonwoven web material, such as from about 75 wt. % to about 99 wt %, such as from about 80 wt. % to about 98 wt. %, such as from about 85 wt. % to about 95 wt. %. However, in other embodiments, the nonwoven web material can include two or more polymers from the polymers discussed above. For instance, monocomponent fibers from which the nonwoven web material can include fibers formed from an olefin homopolymer in an amount ranging from about 5 wt. % to about 80 wt %, such as from about 10 wt. % to about 75 wt. %, such as from about 15 wt. % to about 70 wt. %, based on the total weight of the nonwoven web material. Meanwhile, the fibers can also include a derivative of an olefin polymer. For instance, the nonwoven web material can include an elastomeric semi-crystalline polyolefin or "plastomer" (e.g., an ethylene/α-olefin copolymer, a propylene/α-olefin copolymer, or a combination thereof); a thermoplastic elastomeric block copolymer; or a combination thereof in an amount ranging from about 20 wt % to about 95 wt. %, such as from about 25 wt. % to about 90 wt %, such as from about 30 wt. % to about 85 wt. % based on the total weight of the nonwoven web material.

In additional embodiments, the fibers from which the nonwoven web material is formed can be multicomponent and can have a sheath-core arrangement or side-by-side arrangement. For instance, in a sheath-core multicomponent fiber arrangement, the sheath can include a blend of a polypropylene and a polypropylene-based plastomer, (e.g., VISTAMAXX™, while the core can include a blend of a polyethylene and a polyethylene-based plastomer (e.g., INFUSE™). On the other hand, the sheath can include a blend of a polyethylene and a polyethylene-based plastomer (e.g., INFUSE™), while the core can include a blend of a polypropylene and a polypropylene-based plastomer, (e.g., VISTAMAXX™). Further, in still other embodiments, the core can include 100% of a polyethylene or a polypropylene homopolymer.

For instance, in some embodiments, the fibers from which the nonwoven web material is formed can have a sheath-core arrangement where the sheath can include from about 20 wt. % to about 90 wt. %, such as from about 25 wt. % to about 80 wt. %, such as from about 30 wt. % to about 70 wt. % of an olefin homopolymer (e.g., polypropylene or polyethylene) based on the total weight of the sheath component of the multicomponent fiber. Meanwhile, the sheath can also include from about 10 wt. % to about 80 wt. %, such as from about 20 wt. % to about 75 wt. %, such as from about 30 wt. % to about 70 wt. % of an olefin-based plastomer (e.g., a polypropylene-based plastomer or an ethylene-based plastomer) based on the total weight of the sheath component of the multicomponent fiber.

In addition, the core can include from about 30 wt. % to about 100 wt. %, such as from about 40 wt. % to about 95 wt. %, such as from about 50 wt. % to about 90 wt. % of an olefin homopolymer (e.g., polypropylene or polyethylene) based on the total weight of the core component of the multicomponent fiber. Further, the core can include from about 0 wt. % to about 70 wt. %, such as from about 5 wt. % to about 60 wt. %, such as from about 10 wt. % to about 50 wt. % of an olefin-based plastomer (e.g., a polypropylene-based plastomer or an ethylene-based plastomer) based on the total weight of the core component of the fiber.

Further, the weight percentage of the sheath can range from about 10 wt. % to about 70 wt. %, such as from about 15 wt. % to about 65 wt. %, such as from about 20 wt. % to about 60 wt. %, based on the total weight of the fiber. Meanwhile, the weight percentage of the core can range from about 30 wt. % to about 90 wt. %, such as from about 35 wt. % to about 85 wt. %, such as from about 40 wt. % to about 80 wt. % based on the total weight of the fiber.

In addition, the fibers from which the nonwoven web material is formed can have a side-by-side arrangement where two fibers are coextruded adjacent each other. In such an embodiment, the first side can include a polyethylene and a polyethylene-based plastomer, while the second side can include a polypropylene and a polypropylene-based plastomer. The polyethylene can be present in the first side in an amount ranging from about 30 wt. % to about 90 wt. %, such as from about 35 wt. % to about 80 wt. %, such as from about 40 wt. % to about 70 wt. % based on the total weight of the first side. Meanwhile, the polyethylene-based plastomer can be present in the first side in an amount ranging from about 20 wt. % to about 80 wt. %, such as from about 25 wt. % to about 70 wt. %, such as from about 30 wt. % to about 60 wt. % based on the total weight of the first side. In addition, the polypropylene can be present in the second side in an amount ranging from about 30 wt. % to about 90 wt. %, such as from about 35 wt. % to about 80 wt. %, such as from about 40 wt % to about 70 wt % based on the total weight of the second side. Meanwhile, the polypropylene-based plastomer can be present in the second side in an amount ranging from about 20 wt. % to about 80 wt. %, such as from about 25 wt. % to about 70 wt. %, such as from about 30 wt. % to about 60 wt. % based on the total weight of the second side.

With such fiber configurations as those discussed above, in some embodiments, a propylene-ethylene copolymer can be utilized in either the sheath and/or the core or the first side and/or the second side to act as a compatibilizer and enhance bonding between the sheath and core. For instance, the propylene-ethylene copolymer can be present in the sheath in an amount ranging from about 0.5 wt. % to about 20 wt. %, such as from about 1 wt. % to about 15 wt. %, such as from about 2 wt. % to about 10 wt. % based on the total weight of the sheath. Alternatively, the propylene-ethylene copolymer can be present in the core in an amount ranging from about 0.5 wt. % to about 20 wt. %, such as from about 1 wt. % to about 15 wt. %, such as from about 2 wt. % to about 10 wt. % based on the total weight of the core.

II. Optional Tackifier

Besides the polymers discussed above, the nonwoven web material may also contain other components as is known in the art, such as a tackifier. As an initial matter, however, it is to be understood that in some embodiments, such as when a VISTAMAXX™, INFUSE™, or other polyolefin-based plastomer or elastomeric material is utilized, it may not be necessary to utilize a tackifier, as fibers formed from such polymers may already inherently exhibit sufficient tack. Such polymers have a glass transition temperature ($T_g$) of about 50° C. or below, such as about 25° C. or below, such as about 20° C. or below, such as about 10° C. or below, which allows the molecules in the polymer to be flexible and moveable to provide tackiness. Other polymers having this characteristic include thermoplastic polyurethanes, styrenic block copolymers, polyester/polyether elastomers, olefin plastomers, silicone elastomers, etc.

On the other hand, when utilizing materials in the spunbond or meltblown nonwoven web material that are not inherently tacky, a tackifier can be employed in the fibers used to form the nonwoven web material. Suitable tackifiers resins include, but are not limited to: aliphatic hydrocarbon resins, hydrogenated aliphatic hydrocarbon resins, aliphatic/aromatic hydrocarbon resins, hydrogenated aliphatic aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, polyterpene resins, terpene-phenol resins, rosins and mixtures of two or more thereof. As used herein, rosin includes rosin esters and rosin acids, which may also be hydrogenated.

Suitable commercially available tackifiers that may be used include OPPERA™ PR 100, 101, 102, 103, 104, 105, 106, 111, 112, 115, 120 ECR-373 and ESCOREZ™ 1000, 2000, and 5000 series hydrocarbon resins, available from ExxonMobil Chemical Company, ARKON™ M90, M100, M115 and M135 and SUPER ESTER™ rosin esters available from Arakawa Chemical Company of Japan, SYLVARES™ phenol modified styrene-αmethyl styrene resins, styrenated terpene resins, ZONATAC terpene-aromatic resins, and terpene phenolic resins available from Arizona Chemical Company, SYLVACOTE™, SYLVATAC™ and SYLVALITE™ rosin esters available from Arizona Chemical Company, NORSOLENE™ aliphatic aromatic resins available from Cray Valley of France, DERTOPHENE™ terpene phenolic resins available from DRT Chemical Company of Landes, France, EASTOTAC™ resins, PICCOTAC™ $C_5/C_9$ resins, REGALITE™ and REGALREZ™ aromatic and REGALITE™ cycloaliphatic/aromatic resins available from Eastman Chemical Company of Kingsport, Tenn., WINGTACK™ ET and EXTRA available from Goodyear Chemical Company, FORAL™, PENTALYN™, AND PERMALYN™ rosins and rosin esters available from Eastman Chemical Company, QUINTONE™ acid modified $C_5$ resins, $C_5/C_9$ resins, and acid modified $C_5/C_9$ resins available from Nippon Zeon of Japan, and LX™ mixed aromatic/cycloaliphatic resins available from Neville Chemical Company, CLEARON hydrogenated terpene aromatic resins available from Yasuhara. One suitable example of a suitable material is EMFR 100, which is a tackifier containing 2.5 wt. % maleic anhydride, made by ExxonMobil Chemical Company.

Regardless of the particular tackifier utilized, it can be present in an amount ranging from about 0.01 wt. % to about 20 wt. %, such as from about 0.5 wt. % to about 15 wt. %, such as from about 1 wt. % to about 10 wt. %, such as from about 2.5 wt. % to about 7.5 wt. %, based on the total weight of the nonwoven web material of the present invention. For instance, if the tack cloth of the present invention is multi-layered and contains the nonwoven web material of the present invention and an additional layer, the weight percentage of the tackifier is calculated based on the weight of the nonwoven web material of the present invention but not the additional layer. Further, it is to be understood that the tackifier is compounded with the other components of the fibers used to form the nonwoven web material, and such fibers can be monocomponent fibers or multicomponent (e.g., bicomponent) fibers, and in either case, the tackifier is present on an outer surface of the fiber to aid in trapping particulates in the nonwoven web material upon use.

III. Other Additives

Other additives may also be incorporated into the nonwoven web material, such as melt stabilizers, processing stabilizers, heat stabilizers, light stabilizers, antioxidants, heat aging stabilizers, whitening agents, antiblocking agents, viscosity modifiers, etc. Viscosity modifiers may also be employed, such as polyethylene wax (e.g., EPOLENE™ C-10 from Eastman Chemical). Phosphite stabilizers (e.g., IRGAFOS available from Ciba Specialty Chemicals of Tarrytown, N.Y. and DOVERPHOS available from Dover Chemical Corp. of Dover, Ohio) are exemplary melt stabilizers. In addition, hindered amine stabilizers (e.g., CHIMASSORB available from Ciba Specialty Chemicals) are exemplary heat and light stabilizers. Further, hindered phenols are commonly used as an antioxidant in the production of films. Some suitable hindered phenols include those available from Ciba Specialty Chemicals of under the trade name IRAGANOX™, such as IRGANOX™ 1076, 1010, or E 201. When employed, such additives (e.g., antioxidant, stabilizer, etc.) may each be present in an amount from about 0.001 wt. % to about 25 wt. %, in some embodiments, from about 0.005 wt. % to about 20 wt. %, and in some embodiments, from 0.01 wt. % to about 15 wt. % of the nonwoven web material.

IV. Fiber and Nonwoven Web Material Formation

The polymer and tackifier components discussed above, as well as the other optional additive components discussed above, can be formed into monocomponent or multicomponent fibers and extruded or spun to form the nonwoven web material of the present invention, which can then be used in various products such as a wipe, a tack cloth, or a glove, as shown in FIG. 1 and discussed in more detail below. Monocomponent fibers can be formed from a polymer or a blend of polymers as well as an optional tackifier, which are compounded and then extruded from a single extruder. Meanwhile, multicomponent fibers can be formed from two or more polymers (e.g., bicomponent fibers) extruded from separate extruders, where one or more of the polymers can be compounded with a tackifier, although this is not required when one of the polymers exhibits inherent tackiness, such as VISTAMAXX™ polymers and INFUSE™ polymers. The polymers may be arranged in substantially constantly positioned distinct zones across the cross-section of the fibers. The components may be arranged in any desired configuration, such as sheath-core, side-by-side, pie, island-in-the-sea, three island, bull's eye, or various other arrangements known in the art, and so forth. Various methods for forming multicomponent fibers are described in U.S. Pat. No. 4,789,592 to Taniguchi et al. U.S. Pat. No. 5,336,552 to Strack et al., U.S. Pat. No. 5,108,820 to Kaneko, et al., U.S. Pat. No. 4,795,668 to Kruege, et al., U.S. Pat. No. 5,382,400 to Pike, et al. U.S. Pat. No. 5,336,552 to Strack, et al., and U.S. Pat. No. 6,200,669 to Marmon, et al., which are incorporated herein in their entirety by reference thereto for all purposes. Multicomponent fibers having various irregular shapes may also be formed, such as described in U.S. Pat. No. 5,277,976 to Hogle, et al., U.S. Pat. No. 5,162,074 to Hills, U.S. Pat. No. 5,466,410 to Hills, U.S. Pat. No. 5,069,970 to Largman, et al., and U.S. Pat. No. 5,057,368 to Largman, et al., which are incorporated herein in their entirety by reference thereto for all purposes. In addition, hollow fibers are also contemplated by the present invention, and such fibers can reduce the amount of polymer required, as well as the basis weight of the resulting nonwoven web material.

Figure 2:
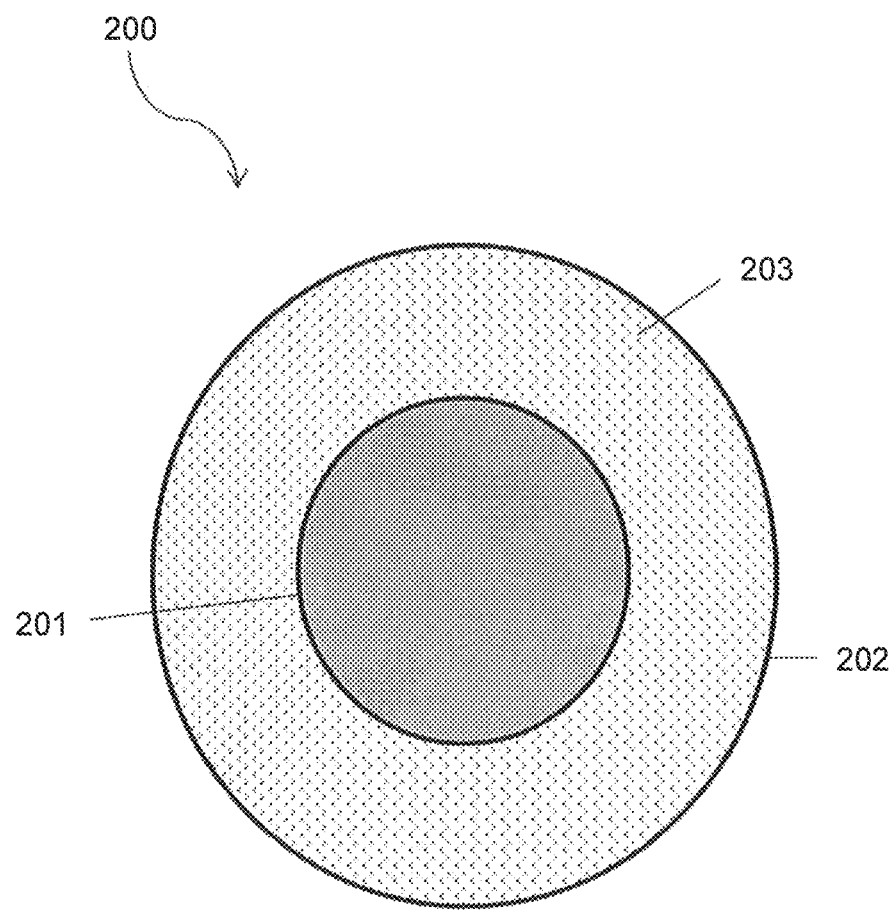
FIG. 2 illustrates a cross-sectional view of a bicomponent fiber made in accordance with the present invention.

In any event, whether the nonwoven web material is formed by meltblowing, spunbonding, or any other nonwoven web material technique, when a tackifier is compounded with one or more polymers, the resulting extruded fiber can be arranged such that a tackifier can be present on an exposed surface of the fiber. For instance, turning to FIG. 2, a bicomponent fiber 200 utilizing a sheath/core arrangement is shown. The core can be formed from a first polymer 201 while the sheath can be formed from a second polymer 202 that has been compounded with a tackifier 203. Because the tackifier 203 has been compounded into the sheath component, which is the outermost component of the sheath/core bicomponent fiber 200, it can be exposed and enhance the attachment of foreign particulates to any nonwoven web material in which the bicomponent fiber 200 is utilized. However, it is also to be understood that, in some embodiments, the core can be a blend of two or more polymers such as polypropylene and a VISTAMAXX™ plastomer, while the sheath can also be a blend of two or polymers such as polyethylene and an INFUSE™ plastomer. Generally, the composition of the core can be chosen such that the resulting overall material is cloth-like, drapable, and soft, while the composition of the sheath can be chosen such that the sheath provides the level of tackiness needed for efficient dirt removal without the user experiencing stick and slip motion, while at the same time leaving no residue.

Moreover, it is also to be understood that, in some embodiments, the use of a tackifier is not necessary. Of course, this is dependent on the polymers chosen for the monocomponent or multicomponent fibers of the nonwoven web material.

Figure 3:
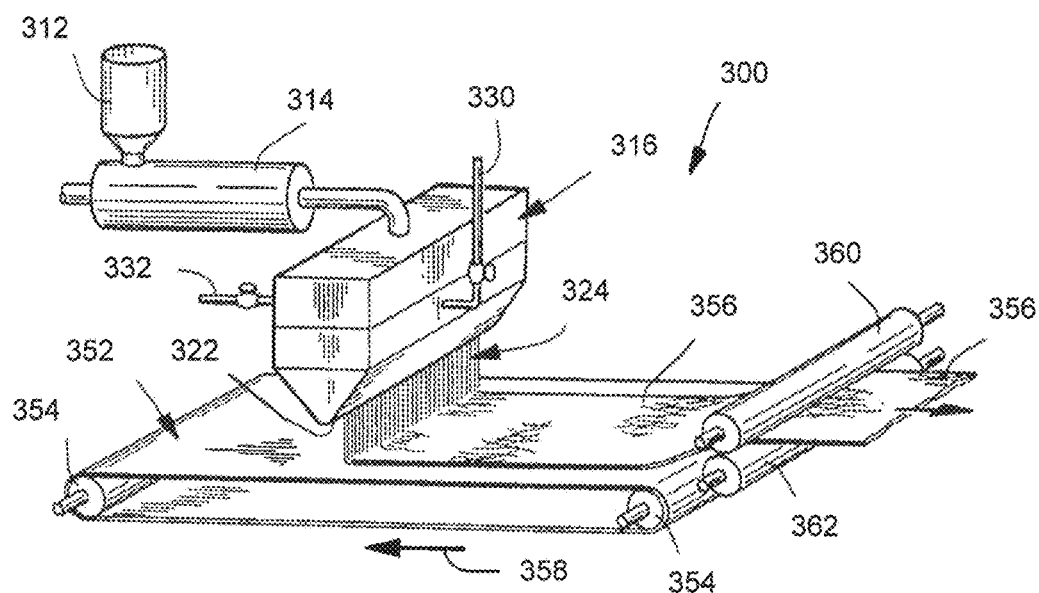
FIG. 3 is a schematic illustration of an apparatus that may be used to form a meltblown nonwoven web material in accordance with the present invention.

Various embodiments of forming the fibers and nonwoven web material of the present invention will now be described in greater detail. Of course, it should be understood that the description provided below is merely exemplary, and that other methods of forming nonwoven web materials are contemplated by the present invention. Referring to FIG. 3, for instance, one embodiment of an apparatus 300 for forming a meltblown nonwoven web material is shown. In forming the elastic nonwoven web of the present invention, pellets (not shown) of one or more polymers can be introduced into a pellet hopper 312 of an extruder 314. The one or more polymers may be mixed with other appropriate materials, such as, for example, a tackifier, pigments, antioxidants, stabilizers, waxes, flow promoters, solid solvents, particulates and processing enhancing additives, prior to or after introduction of the polymeric material into the hopper 312 to form a blend.

As the blend advances through the extruder 314, it is progressively heated to a molten state. A die 316 contains orifices (not shown) at its tip 322, and the molten blend emerges from the orifices of the die 316 as molten strands or threads 324, which can be formed into monocomponent fibers as discussed above. However, it is also to be understood that the threads 324 can be formed into multicomponent fibers by changing the die arrangement and by using multiple extruders (not shown) to extrude the various polymer components as separate strands which can be, for instance, configured in a sheath/core fiber arrangement.

Generally, to form the fibers, the die 316 can utilize pressurized attenuating gas sources 330 and 332 that converge to form a stream of gas which entrains and attenuates the molten threads 324 into fibers. The fibers 324 are blown, by the action of the attenuating gas, onto a collecting arrangement illustrated as a foraminous endless belt 352 driven by rollers 354. Other foraminous arrangements such as a rotating drum could be utilized. One or more vacuum boxes (not illustrated) may be located below the surface of the foraminous belt 352 and between the rollers 354 to assist in retention of a matrix of fibers 324 on the belt 352, which is rotating as indicated by the arrow 358. The vacuum boxes assist in retention of the matrix on the surface of the belt 352. The thus-collected, entangled fibers 324 are coherent and may be removed from the belt 352 as a self-supporting nonwoven web material 356 by a pair of nip rollers 360 and 362, which may be designed to press the fibers of the web 356 together to improve the integrity of the web 356. In some embodiments, the foraminous belt 352 can incorporate various forming wires having various textures, as shown in FIGS. 5-8, so that the fibers 324 can be collected to form a non-woven web material 356 having a textured surface to enhance its dust holding capacity. The textured forming wires of FIGS. 5-8 can provide a three-dimensional topography to the nonwoven web material of the present invention to enhance the desired performance. The present inventors have found that a textured forming wire forms a textured nonwoven web material that produces less lint than a non-textured nonwoven web material formed on a smooth, flat forming wire. Further, in some embodiments, the nip rollers 360 and 362 or other rollers (not shown) can be used to post bond and/or aperture the nonwoven web material 356, as is discussed in more detail below, which can also enhance the dust holding capacity of the nonwoven web material 356.

Although the nonwoven web material can be formed from meltblown fibers as discussed above, it is also to be understood that the nonwoven web material can be formed from fibers formed by other methods than meltblowing, such as spunbonding. One advantage of forming the nonwoven web material by spunbonding is that higher molecular weight polymers can be utilized as compared to the polymers used to form a meltblown nonwoven web material because the size of the capillary dies used in spunbonding equipment is larger than in meltblowing equipment. However, it is also to be understood that in the case of forming a meltblown nonwoven web material, the size of the capillary of the melt blown die can be increased to accommodate high viscosity (e.g., high molecular weight. The present inventors have discovered that utilizing higher molecular weight polymers results in less fiber breakage and hence, less lint production, than when lower molecular weight polymers are used to form the nonwoven web material. Generally, however, the melt flow rate of the polymers of the present invention can range from about 3 grams per 10 minutes to about 50 grams per 10 minutes when subjected to a load of 2160 grams at a temperature of 190° C. according to ASTM Test Method D1238-E. As such, in forming spunbond nonwoven web materials, polymers having higher viscosity and crystallinity can be used. For instance, polypropylene having a melt flow rate of from about 15 grams per 10 minutes to about 50 grams per 10 minutes, such as from about 20 grams per 10 minutes to about 35 grams per 10 minutes; olefinic block copolymer plastomers having a melt flow rate of from about 3 grams per 10 minutes to about 20 grams per 10 minutes, such as from about 10 grams per 10 minutes to about 15 grams per 10 minutes; and polyethylenes having a melt flow rate of from about 5 grams per 10 minutes to about 30 grams per 10 minutes, such as from about 10 grams per 10 minutes to about 25 grams per 10 minutes can be utilized.

Figure 4:
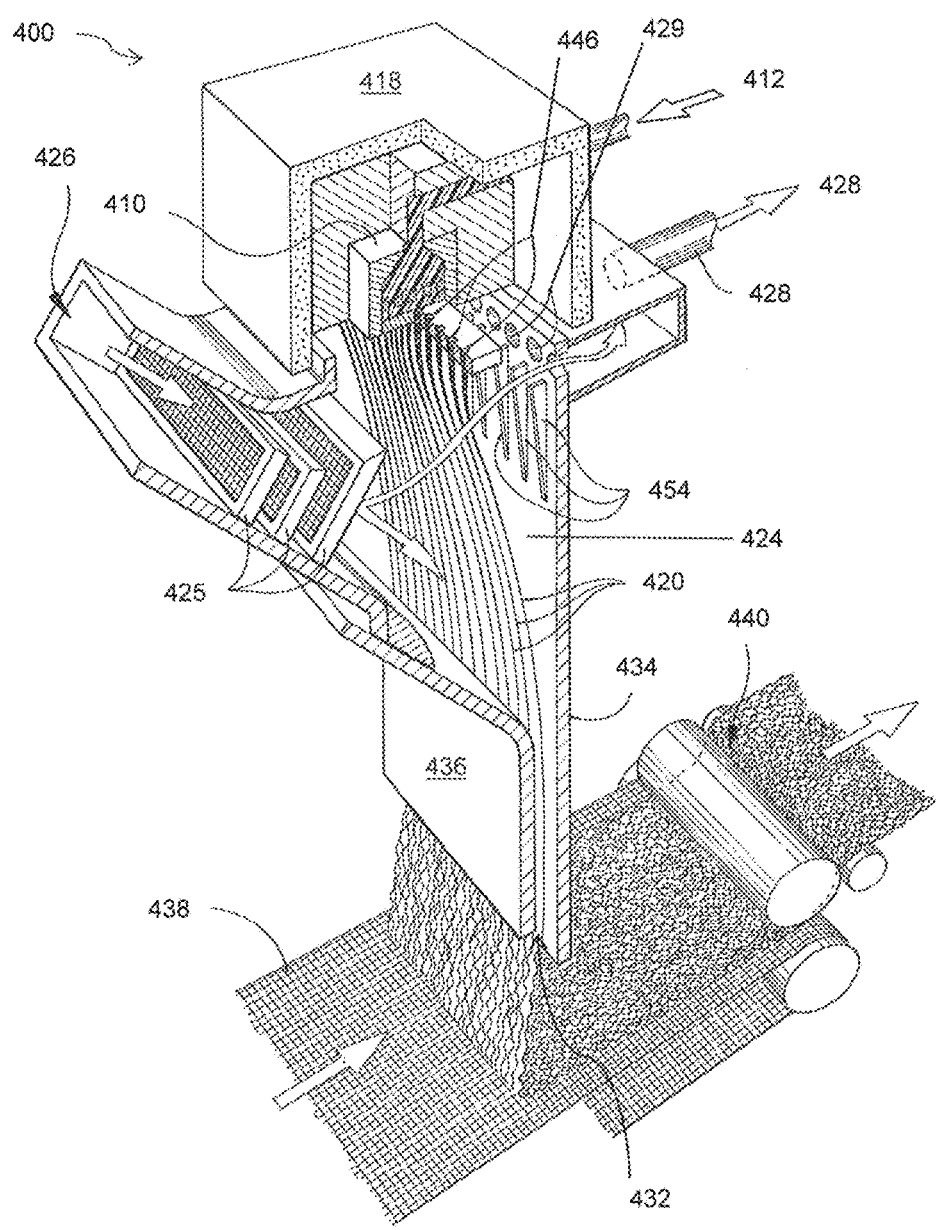
FIG. 4 is a schematic illustration of an apparatus that may be used to form a spunbond nonwoven web material in accordance with the present invention.
Figure 5:
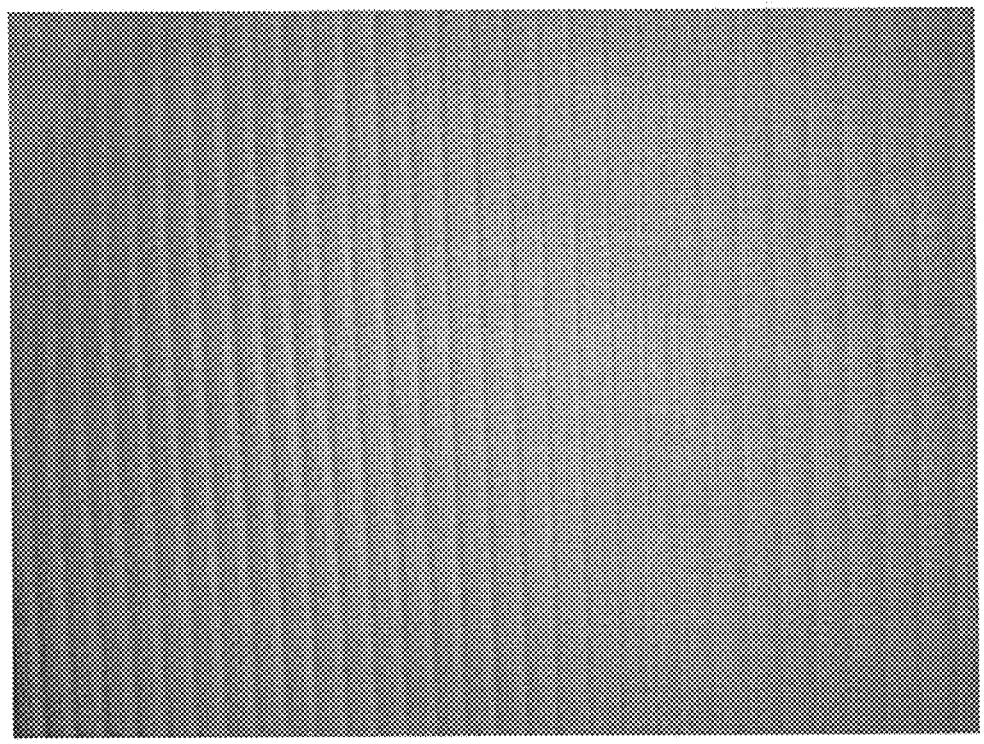
FIG. 5 illustrates one embodiment of a texturizing pattern that may be used in accordance with the present invention.
Figure 6:
FIG. 6 illustrates another embodiment of a texturizing pattern that may be used in accordance with the present invention.
Figure 7:
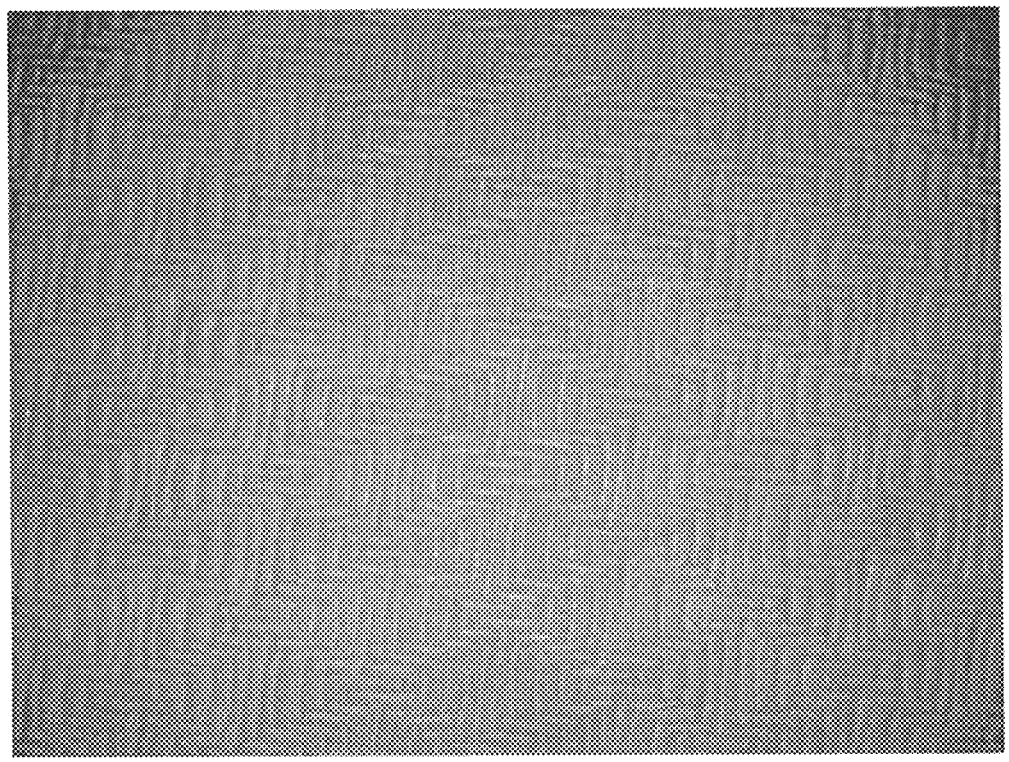
FIG. 7 illustrates still another embodiment of a texturizing pattern that may be used in accordance with the present invention.
Figure 8:
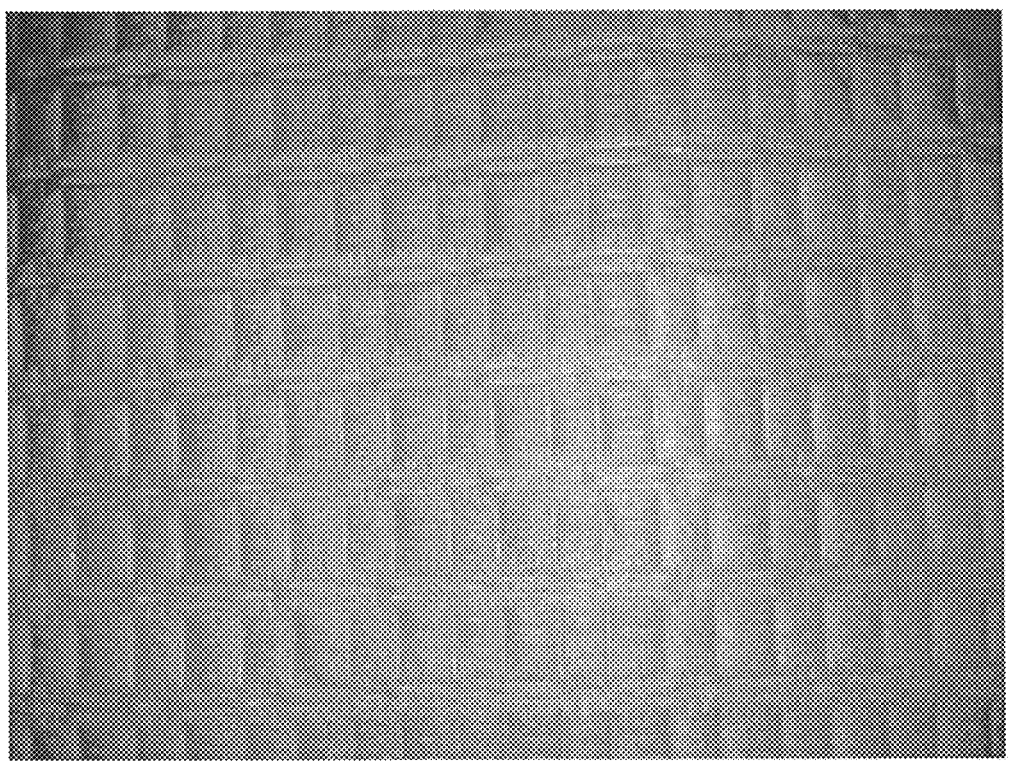
FIG. 8 illustrates yet another embodiment of a texturizing pattern that may be used in accordance with the present invention.

Referring now to FIG. 4, one embodiment of an apparatus 400 for forming a spunbond nonwoven web material is shown. As shown, the first step is to provide one or more polymers 412 in fluid condition for spinning. The polymer 412 is fed from a supply to a hopper, then through an extruder, a filter, and a metering pump to spin box 418. Filaments 420 are spun through spinnerette 410 with openings arranged in one or more rows forming a curtain of filaments 420 directed into the quench chamber 424. It is to be understood that at the spinnerette 410, the filaments 420 can take the form of monocomponent or multicomponent fibers as discussed above depending on the number and arrangement of the polymers and other components introduced, as well as the arrangement of orifices 446. In the quench chamber 424, the filaments 420 are contacted with air or other cooling fluid which is supplied through one or more screens 425 through air inlet 426. The quenching fluid is preferably directed through the filament curtain 420 and removed as exhaust through port 428. The exhaust air fraction exiting at 428 from ports 429 affects how fast quenching of the filaments takes place. In one embodiment, some means such as fins 454 can be provided to prevent a turbulent eddy zone from forming.

As quenching is completed, the filament curtain 420 is directed through the quenching chamber 424 into nozzle 432 formed by a stationary wall 434 and a movable wall 436. The position of the movable wall 436 determines the drawing nozzle opening. After exiting from the nozzle, the filaments may be collected on a moving foraminous surface 438 to form a nonwoven web 440. In addition, various forming wires having various patterns can be used to impart the desired texture onto the nonwoven web material 440 as shown in the meltblown examples of FIGS. 5-8, which can enhance the dust holding capacity of the nonwoven web material 440, although such wires can be used in spunbond examples as well. Further, in some embodiments, one or more patterned rollers (not shown) can be used to post bond and/or aperture the nonwoven web material 440, as is discussed in more detail below, which can also enhance the dust holding capacity of the nonwoven web material 440.

If desired, the nonwoven web material may have a multi-layer structure. Suitable multi-layered materials may include, for instance, spunbond/meltblown/spunbond (SMS) laminates and spunbond/meltblown (SM) laminates, where the spunbond and meltblown layers are formed generally as discussed above in reference to FIGS. 3 and 4.

Another example of a nonwoven web material that is contemplated by the present invention is a spunbond web produced on a multiple spin bank machine in which a spin bank deposits fibers over a layer of fibers deposited from a previous spin bank. Such an individual spunbond nonwoven web may also be thought of as a multi-layered structure. In this situation, the various layers of deposited fibers in the nonwoven web may be the same, or they may be different in basis weight and/or in terms of the composition, type, size, level of crimp, and/or shape of the fibers produced. As another example, a single nonwoven web may be provided as two or more individually produced layers of a spunbond web, a carded web, etc., which have been bonded together to form the nonwoven web. These individually produced layers may differ in terms of production method, basis weight, composition, and fibers.

A nonwoven web material as contemplated by the present invention may also contain an additional fibrous component such that it is considered a composite. For example, a nonwoven web may be entangled with another fibrous component using any of a variety of entanglement techniques known in the art (e.g., hydraulic, air, mechanical, etc.). In one embodiment, a nonwoven web formed from one polymer can be integrally entangled with fibers containing another polymer using hydraulic entanglement. A typical hydraulic entangling process utilizes high pressure jet streams of water to entangle fibers to form a highly entangled consolidated fibrous structure, e.g., a nonwoven web. Hydraulically entangled nonwoven webs are disclosed, for example, in U.S. Pat. No. 3,494,821 to Evans and U.S. Pat. No. 4,144,370 to Boulton, which are incorporated herein in their entirety by reference thereto for all purposes. The fibrous component of the composite may contain any desired amount of the resulting composite. For instance, the fibrous component may contain greater than about 50% by weight of the composite, and in some embodiments, from about 60% to about 90% by weight of the composite. Likewise, the nonwoven web may contain less than about 50% by weight of the composite, and in some embodiments, from about 10% to about 40% by weight of the composite. In some embodiments, the nonwoven web can include a spunbond polyolefin-based web (e.g., polypropylene or polyethylene), while the fibrous component can include fibers containing a blend of polypropylene and VISTA-MAXX™ or any other propylene-based plastomer, or a blend of polyethylene and INFUSE™ or any other suitable ethylene-based plastomer.

The nonwoven web material can also be hydroentangled. Hydroentangled nonwoven webs are disclosed, for example, in U.S. Pat. No. 7,779,521 to Topolkaraev, et al. With hydroentangling, layer of fibers is deposited on a foraminous support. The foraminous support is commonly a continuous wire screen, sometimes called a forming fabric. Forming fabrics are commonly used in the nonwovens industry and particular types are recognized by those skilled in the art as being advantageous for hydroentangling purposes. Alternatively, the foraminous support may be the surface of a cylinder, and generally may be any surface that supports the fibers and transports them under the water jets or water curtain that impart the energy to entangle the fibers. Innovent Inc. of Peabody, Mass., USA, the aforementioned Rieter Perfojetand, and Fleissner sell screens and cylinders suitable for this purpose.

Typically the foraminous support has holes to allow water drainage, but alternatively or additionally the foraminous support may have elevations or grooves, to allow drainage and impart topographic features on the finished fabric. In this context "water" indicates a fluid that is predominantly water, but may contain intentional or unintentional additives, including minerals, surfactants, defoamers, and various processing aides.

When the fibers are deposited on the support they may be completely unbonded, alternatively the fibers may be lightly bonded in the form of a nonwoven when they are deposited on the foraminous support. In other aspects of this invention, unbonded fibers may be deposited on the support and prior to hydroentangling the fibers may be lightly bonded using heat or other means. It is generally desirable that the fibers passing under the water jets have sufficient motility to efficiently hydroentangle.

The general conditions of hydroentangling, i.e., water pressure, nozzle-type, design of the foraminous support, are well known to those skilled in the art. "Hydroentangle" and its derivatives refer to a process for forming a fabric by mechanically wrapping and knotting fibers into a web through the use of a high-velocity jets or curtains of water. The resulting hydroentangled fabric is sometimes called "spunlaced" or "hydroknit" in the literature.

Generally, a high pressure water system delivers water to nozzles or orifices from which high velocity water is expelled. The layer of fibers is transported on the foraminous support member through at least one high velocity water jet or curtain. Alternatively, more than one water jet or curtain may be used. The direct impact of the water on the fibers causes the fibers to wind and twist and entangle around nearby fibers. Additionally, some of the water may rebound off the foraminous support member, this rebounding water also contributes to entanglement. The water used for hydroentangling is then drained into a manifold, typically from beneath the support member, and generally recirculated. As a result of the hydroentangling process, the fibers are converted into a coherent fabric.

Regardless of the type of nonwoven web material formed, the basis weight of the nonwoven web material may generally vary, such as from about 10 grams per square meter ("gsm") to about 150 gsm, in some embodiments from about 20 gsm to about 125 gsm, and in some embodiments, from about 25 gsm to about 100 gsm. When multiple nonwoven web materials are used, such materials may have the same or different basis weights.

V. Aperturing and Post-Bonding of the Nonwoven Web Material

Once the meltblown nonwoven web material 356, the spunbond nonwoven web material 440, or any other nonwoven web material, the nonwoven web material can be further processed to reduce lint left behind when the nonwoven web material is used, to minimize the amount of residue or streaks present on a surface after the surface is contacted with the nonwoven web material, and to enhance the dust holding capacity of the nonwoven web material.

For instance, as discussed above, the nonwoven web material can be apertured, post-bonded, or both. Aperturing can enhance the dust holding capacity of the nonwoven web material by creating pockets in the nonwoven web material in which particulates, dust, pathogens, etc. can be trapped. Aperturing can occur by any suitable method known to one having ordinary skill in the art, such as laser aperturing, slit aperturing, pin aperturing, or thermal aperturing using a patterned roll.

Meanwhile post-bonding can reduce the amount of lint produced by the nonwoven web material and can also enhance the dust holding capacity of the nonwoven web material by creating indentations in the nonwoven web material in which particulates, dust, pathogens, etc. can be trapped. Although not required, the processes to form apertures and bonds in the nonwoven web material can occur concurrently. However, it should be understood that other methods of forming the apertures and bonds that are not concurrent can also be utilized, as is known to those having ordinary skill in the art.

To concurrently form apertures and textured elements on the nonwoven web material, a patterned bonding technique (e.g., thermal point bonding, ultrasonic bonding, etc.) is generally used in which the nonwoven web material is supplied to a nip defined by at least one patterned roll. Thermal point bonding, for instance, typically employs a nip formed between two rolls, at least one of which is patterned. Ultrasonic bonding, on the other hand, typically employs a nip formed between a sonic horn and a patterned roll. Regardless of the technique chosen, the patterned roll contains a plurality of raised bonding elements to concurrently bond the nonwoven web material and form apertures in the nonwoven web material.

The size of the bonding elements may be specifically tailored to facilitate the formation of apertures in the nonwoven web material and enhance bonding between the fibers contained in the nonwoven web material. For example, the length dimension of the bonding elements may be from about 300 to about 5000 micrometers, in some embodiments from about 500 to about 4000 micrometers, and in some embodiments, from about 1000 to about 2000 micrometers. The width dimension of the bonding elements may likewise range from about 20 to about 500 micrometers, in some embodiments from about 40 to about 200 micrometers, and in some embodiments, from about 50 to about 150 micrometers. In addition, the "element aspect ratio" (the ratio of the length of an element to its width) may range from about 2 to about 100, in some embodiments from about 4 to about 50, and in some embodiments, from about 5 to about 20.

Besides the size of the bonding elements, the overall bonding pattern may also be selectively controlled to achieve the desired aperture formation. In one embodiment, for example, a bonding pattern is selected in which the longitudinal axis (longest dimension along a center line of the element) of one or more of the bonding elements is skewed relative to the machine direction ("MD") of the nonwoven web material. For example, one or more of the bonding elements may be oriented from about 30° to about 150°, in some embodiments from about 45° to about 135°, and in some embodiments, from about 60° to about 120° relative to the machine direction of the nonwoven web material. In this manner, the bonding elements will present a relatively large surface to the nonwoven web material in a direction substantially perpendicular to that which the nonwoven web material moves. This increases the area over which shear stress is imparted to the nonwoven web material and, in turn, facilitates aperture formation.

Figure 9:
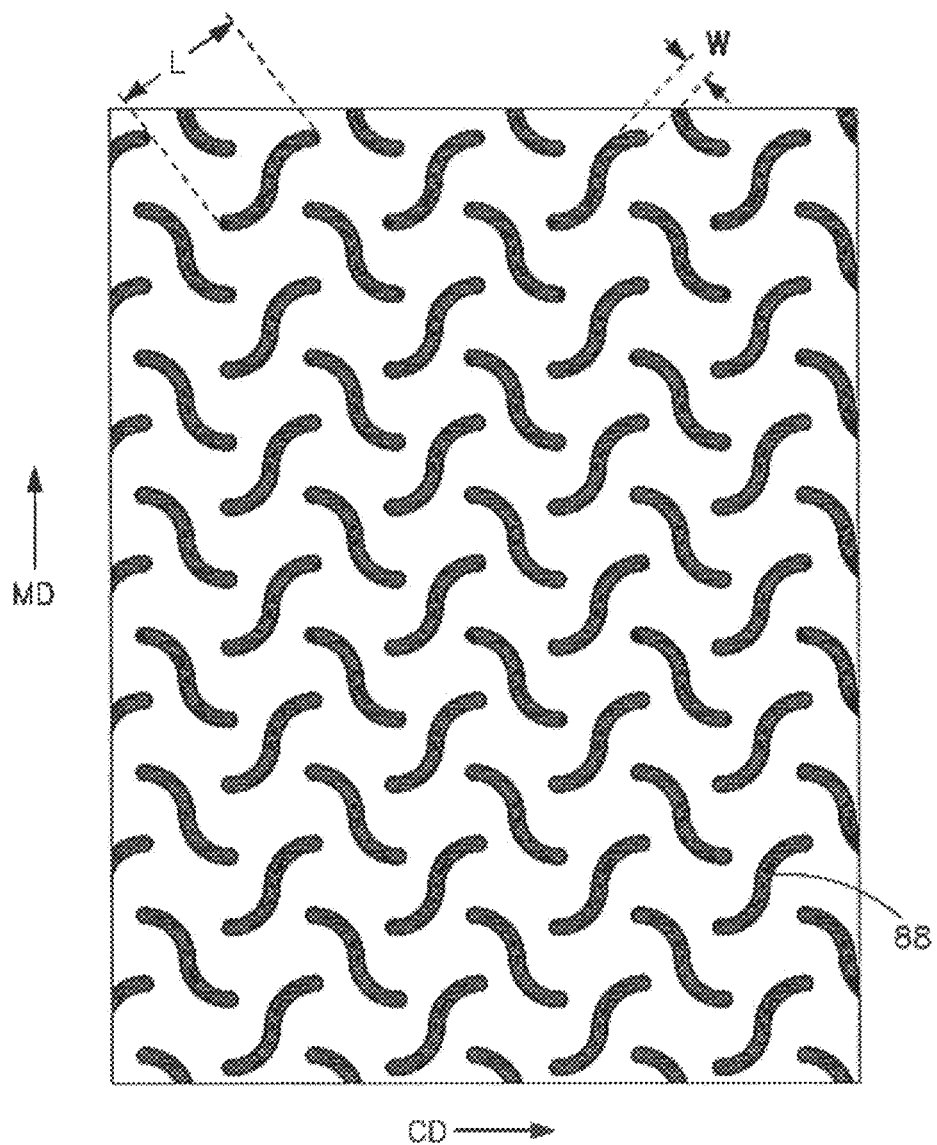
FIG. 9 illustrates one embodiment of an "S-weave" bonding pattern that may be used in accordance with the present invention.
Figure 10:
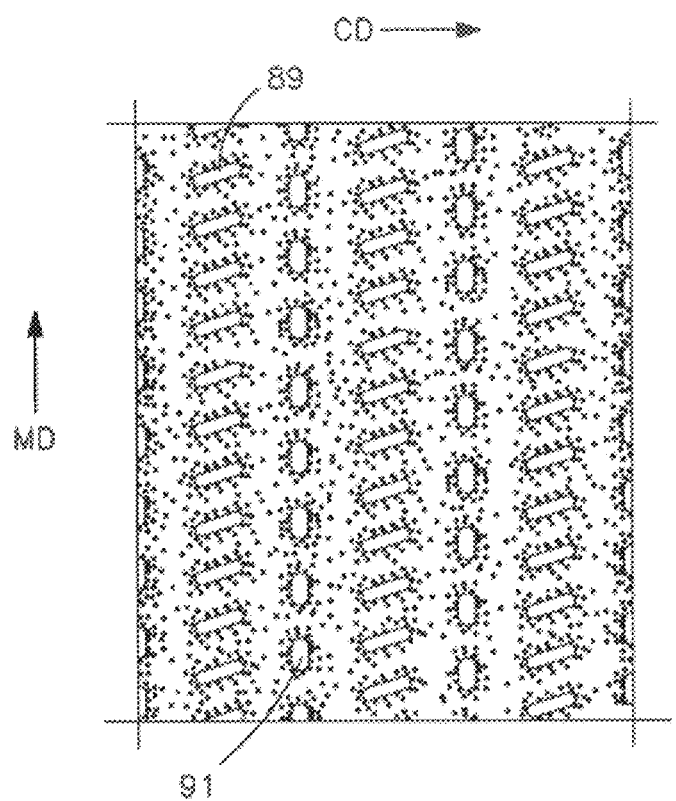
FIG. 10 illustrates one embodiment of a "rib-knit" bonding pattern that may be used in accordance with the present invention.
Figure 11:
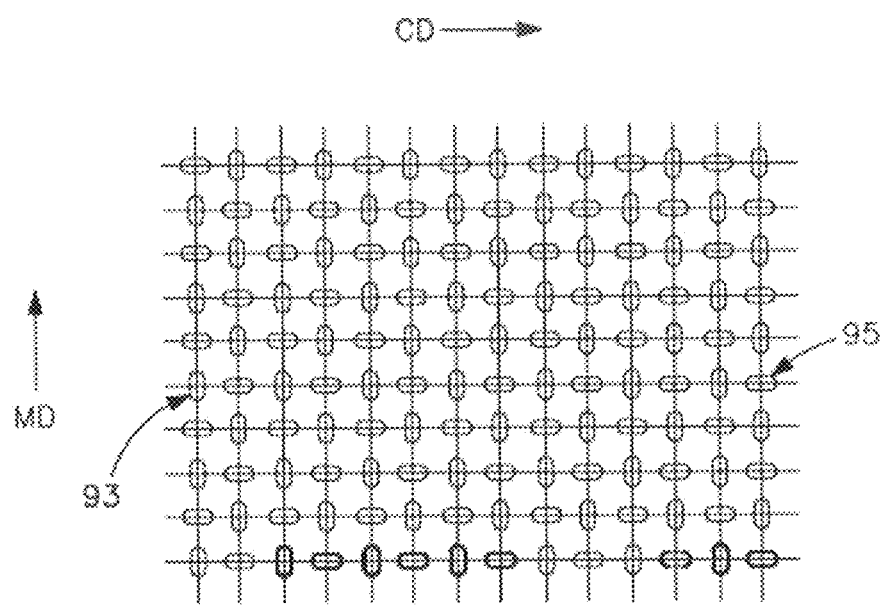
FIG. 11 illustrates one embodiment of a "wire-weave" bonding pattern that may be used in accordance with the present invention.

The pattern of the bonding elements is generally selected so that the nonwoven web material has a total bond area of less than about 50% (as determined by conventional optical microscopic methods), in some embodiments, less than about 40%, and in some embodiments, less than about 25%. The bond density is also typically greater than about 50 bonds per square inch, and in some embodiments, from about 75 to about 500 pin bonds per square inch. One suitable bonding pattern for use in the present invention is known as an "S-weave" pattern and is described in U.S. Pat. No. 5,964,742 to McCormack, et al., which is incorporated herein in its entirety by reference thereto for all purposes. S-weave patterns typically have a bonding element density of from about 50 to about 500 bonding elements per square inch, and in some embodiments, from about 75 to about 150 bonding elements per square inch. An example of a suitable "S-weave" pattern in shown in FIG. 9, which illustrates S-shaped bonding elements 88 having a length dimension "L" and a width dimension "W." Another suitable bonding pattern is known as the "rib-knit" pattern and is described in U.S. Pat. No. 5,620,779 to Levy, et al., which is incorporated herein in its entirety by reference thereto for all purposes. Rib-knit patterns typically have a bonding element density of from about 150 to about 400 bonding elements per square inch, and in some embodiments, from about 200 to about 300 bonding elements per square inch. An example of a suitable "rib-knit" pattern in shown in FIG. 10, which illustrates bonding elements 89 and bonding elements 91, which are oriented in a different direction. Yet another suitable pattern is the "wire weave" pattern, which has a bonding element density of from about 200 to about 500 bonding elements per square inch, and in some embodiments, from about 250 to about 350 bonding elements per square inch. An example of a suitable "wire-weave" pattern in shown in FIG. 11, which illustrates bonding elements 93 and bonding elements 95, which are oriented in a different direction. Other bond patterns that may be used in the present invention are described in U.S. Pat. No. 3,855,046 to Hansen et al.; U.S. Pat. No. 5,962,112 to Haynes et al.; U.S. Pat. No. 6,093,665 to Sayovitz et al.; D375,844 to Edwards, et al.; D428,267 to Romano et al.; and D390,708 to Brown, which are incorporated herein in their entirety by reference thereto for all purposes.

The selection of an appropriate bonding temperature (e.g., the temperature of a heated roll) will help melt and/soften nonwoven web material at regions adjacent to the bonding elements. The softened nonwoven web material may then flow and become displaced during bonding, such as by pressure exerted by the bonding elements.

To achieve such concurrent aperture and bond formation without substantially softening the polymer(s) of the nonwoven web material, the bonding temperature and pressure may be selectively controlled. For example, one or more rolls may be heated to a surface temperature of from about 50° C. to about 160° C., in some embodiments from about 60° C. to about 140° C., and in some embodiments, from about 70° C. to about 120° C. Likewise, the pressure exerted by rolls ("nip pressure") during thermal bonding may range from about 75 to about 600 pounds per linear inch (about 1339 to about 10,715 kilograms per meter), in some embodiments from about 100 to about 400 pounds per linear inch (about 1786 to about 7143 kilograms per meter), and in some embodiments, from about 120 to about 200 pounds per linear inch (about 2143 to about 3572 kilograms per meter). Of course, the residence time of the materials may influence the particular bonding parameters employed.

Another factor that influences concurrent aperture and bond formation is the degree of tension in the nonwoven web material. An increase in nonwoven web material tension when it is passed over the bonding elements, for example, typically correlates to an increase in aperture size. Of course, a tension that is too high may adversely affect the integrity of the nonwoven web material, which could negatively impact the ability to form a cloth with sufficient tackiness and minimal lint production. Thus, in most embodiments of the present invention, a stretch ratio of about 1.5 or more, in some embodiments from about 2.5 to about 7.0, and in some embodiments, from about 3.0 to about 5.5, is employed to achieve the desired degree of tension in the film during lamination. The stretch ratio may be determined by dividing the final length of the film by its original length.

Generally, the size and/or pattern of the resulting apertures in the nonwoven web material correspond to the size and/or pattern of the bonding elements discussed above. That is, the apertures may have a length, width, aspect ratio, and orientation as described above. For example, the length dimension of the apertures may be from about 200 to about 5000 micrometers, in some embodiments from about 350 to about 4000 micrometers, and in some embodiments, from about 500 to about 2500 micrometers. The width dimension of the apertures may likewise range from about 20 to about 500 micrometers, in some embodiments from about 40 to about 200 micrometers, and in some embodiments, from about 50 to about 150 micrometers. In addition, the "aspect ratio" (the ratio of the length of an aperture to its width) may range from about 2 to about 100, in some embodiments from about 4 to about 50, and in some embodiments, from about 5 to about 20. Similarly, the longitudinal axis of one or more of the apertures (longest dimension along a center line of the aperture) may be skewed relative to the machine direction of the nonwoven web material, such as from about 30° to about 150°, in some embodiments from about 45° to about 135°, and in some embodiments, from about 60° to about 120° relative to the machine direction of the nonwoven web material.

VI. Fluorination

In addition to the additives and treatments discussed above, which can be utilized to minimize residue and lint while increasing the particulate, dust, pathogen, etc. holding capacity of the nonwoven web material of the present invention, the nonwoven web material can also be subjected to a fluorination treatment to further enhance the dust holding capacity of the nonwoven web material. The fluorination treatment can be in the form of an elemental fluorine gas applied to the nonwoven web material. Such processing is described in U.S. Pat. No. 7,976,662 to Thomas, et al., which is incorporated herein in its entirety by reference thereto for all purposes. As a result of the treatment, the elemental fluorine is covalently bonded to the polymer or polymers in the nonwoven web material and attaches to the polymer backbone.

It is to be understood that the level of fluorination can be adjusted such that the resulting nonwoven web material can exhibit hydrophilic behavior, hydrophobic behavior, or intermediary behavior based on the application in which the nonwoven web material will be used. Regardless, because of the permanent covalent bond that is formed, the particulate holding capacity of the fluorine-treated nonwoven web is improved.

VII. Products

The nonwoven web material of the present invention, having the characteristics discussed above, may be used in a wide variety of applications. In some embodiments, the nonwoven web material can be in the form of a wipe, sheet, or towel, while in other embodiments, the nonwoven web material can be in the form of a glove that can be used as a tack cloth. Turning to FIG. 1, for instance, one embodiment of a glove 110 is shown that is in the shape of a human hand. The glove 110 has a palm region 110a, a plurality of finger portions 110b, and a thumb portion 110c. In this particular embodiment, the glove 110 contains first and second nonwoven web materials 120 and 122, respectively, formed in accordance with the present invention. The nonwoven web materials 120 and 122 are joined at a location proximate to their perimeters by sewing and then inverting the glove 110 so that a seam 136 becomes located on the interior of the glove 110. Of course, the glove 110 need not be inverted, and the seam 136 can remain on the exterior of the glove 110. Also, the nonwoven web materials 120 and 122 need not be joined in a way that produces a seam. For example, the edges of the individual nonwoven web materials 120 and 122 may be placed adjacent to each other and joined ultrasonically, thermally, adhesively, cohesively, using tape, by fusing the materials together (e.g., by using an appropriate solvent), by welding the materials together, or by other approaches. The glove 110 may be used to, for example, wipe down surfaces during automotive painting, where maintaining a lint and particulate free surface is crucial, as is leaving no residue or streaks on the surface that is wiped.

In still another embodiment, the tack cloth can be in the form of a pocketed cloth formed by folding, for example, a nonwoven web material and bonding or sewing the nonwoven web material at the folded end to create a seam. The nonwoven web material can also be bonded or sewn along opposing sides such that only one of the four sides of the resulting cloth remains unbonded. As such, a pocket is formed in which the user's hand can be inserted, and the resulting pocketed cloth resembles a glove except with the thumb and finger portions discussed above. The pocketed cloth is more efficient to manufacture than, for example, a glove, and is always easy to use. In yet another embodiment, the tack cloth can be used as a cover to be fitted over a tool such as a mop head or a robotic wiping arm or hand. Further, it is to be understood that the tack cloth can be a multi-layered product, where a layer that contacts a surface to be wiped can include the nonwoven web material of the present invention, while an additional layer can include a material that does not necessarily need to include the tack characteristics described herein. Instead, the additional layer can be selected based on other characteristics, such as the health or comfort of the wearer. For example, when the tack cloth is in the form of a glove, the outer layer of the glove can include the nonwoven web material of the present invention, while the inner layer of the glove can include components they made add to the health and comfort of the wearer of the glove.

In general, the nonwoven web material of the present invention, based on the elements discussed above, exhibits improved particulate holding capacity, produces minimal levels of lint, and does not leave residue on surfaces that are wiped with the nonwoven web material. The nonwoven web material also has the benefit of being generally silicone free and emits minimal levels of volatile organic compounds. For instance, the nonwoven web material shows no evidence of silicone oil according to Boeing Material Specification (BMS) 15-5F section 8.2 "Method for Determination of Silicone Greases and Oils." Further, because no solvents are used in forming the nonwoven web material of the present invention, it emits very low to no volatile organic compounds (less than 5000 parts per million) as determined by ASTM D23694.

For instance, the nonwoven web material can exhibit a particulate or dust holding capacity greater than about 10 grams per gram (g/g), such as from about 10 g/g to about 80 g/g, such as from about 15 g/g to about 75 g/g, such as from about 20 g/g to about 70 g/g, as determined by the method discussed below. Further, the nonwoven web material can exhibit a particulate or dust holding capacity greater than about 10 grams per square meter ($g/m^2$), such as from about 10 $g/m^2$ to about 130 $g/m^2$, such as from about 15 $g/m^2$ to about 100 $g/m^2$, such as from about 20 $g/m^2$ to about 60 $g/m^2$.

The dust holding capacity discussed above is determined as follows. First, a 2-inch circular sample of the material to be tested is cut. The sample is then weighed to determine the pre-test weight ($W_{pre}$). Next, 5 grams of ISO standard A4 dust is weighed in a petri-dish having a 2.5 inch diameter to create a uniform, flat dust surface. The sample of the material to be tested is placed on top of the dust, then a 1 kilogram weight is placed on top of the sample such that the weight is carried by the entire area of the sample uniformly. After 5 minutes, the weight is removed, and the sample is carefully removed and weighed to determine the post-test weight ($W_{post}$). The dust holding capacity in grams of dust per gram of material (g/g) is determined by the following equation: $(W_{post}-W_{pre})/W_{pre}*100$. The dust holding capacity in grams per square meter ($g/m^2$) is determined by the following equation: $(W_{post}-W_{pre})/$Area of sample.

Further, according to the results of the lint potential test method discussed below, the nonwoven web material of the present invention can produce very little lint, such as less than about 5 fibers per square centimeter (fibers/$cm^2$). For instance, the nonwoven web material produces from about 0.001 fibers/$cm^2$ of lint to about 7.5 fibers/$cm^2$ of lint, such as from about 0.005 fibers/$cm^2$ to about 7.5 fibers/$cm^2$, such as from about 0.01 fibers/$cm^2$ to about 5 fibers/$cm^2$, such as from about 0.1 fibers/$cm^2$ to about 3 fibers/$cm^2$.

The lint potential discussed above is determined as follows. A 4-inch piece of 3M Magic Scotch tape (3M CAT

810 or equivalent) is placed on a surface of the material to be tested. Then, a standard 4.5 pound roller is rolled on top of the tape. The tape is then peeled off the surface and examined using a microscope, where the magnification is set such that the viewing area is roughly 1 centimeter by 0.75 centimeters. The number of fibers in the field of view are counted, and this process is repeated 20 times. The lint potential in fibers/cm$^2$ is then determined from the following equation: (Average number of fibers in the 20 measurements)/(viewing area in cm$^2$).

The nonwoven web material of the present invention also leaves minimal residue on surfaces that are wiped with the material and on the hands of the user. For instance, the amount of residue present on a surface wiped with the nonwoven web material can range from about 0 grams/meter squared (g/m$^2$) to about 0.02 g/m$^2$, such as from about 0 g/m$^2$ to about 0.0175 g/m$^2$, such as from about 0 g/m$^2$ to about 0.015 g/m$^2$.

The amount of residue on a surface produced or left by the nonwoven web material as discussed above is determined according to the RTI International Test method entitled "Tack Transfer as per RTI SOP 5504." The residue left on a surface by the wipe or tack cloth is then reported in grams per meter squared (g/m$^2$).

The present invention may be better understood with reference to the following example.

EXAMPLE 1

Meltblown nonwoven web material samples as shown in Table 1 below were prepared and then tested for their dust holding capacity as explained in the method above. The samples were prepared by compounding all of the components, after which the compounded components were extruded into monocomponent fibers and a meltblown web was formed. As indicated in Table 1, the webs in some samples were apertured and/or formed to have various textures based on the forming wire used. The resulting textures are shown in FIGS. 5-8, wherein FIG. 5 corresponds with wire 1, FIG. 6 corresponds with wire 2, FIG. 7 corresponds with wire 3, and FIG. 8 corresponds with wire 4.

TABLE 1

| Sample No. | Component A Polymer | Wt. % | Component B Polymer | Wt. % | Component C Polymer | Wt. % | Basis Weight (gsm) | Additional Processing | Dust Holding Capacity g/g | g/m$^2$ |
|---|---|---|---|---|---|---|---|---|---|---|
| 1 | Propylene 1 | 100 | — | | — | | 100 | None | 9.4 | 8.7 |
| 2 | Propylene 2 | 100 | — | | — | | 100 | None | 8.5 | 8.3 |
| 3 | Plastomer 1 | 75 | Propylene 2 | 25 | — | | 100 | None | 22.2 | 17.8 |
| 4 | Plastomer 1 | 75 | Propylene 2 | 25 | — | | 75 | None | 27.6 | 21.9 |
| 5 | Plastomer 1 | 60 | Propylene 2 | 35 | Tackifier 1 | 5 | 75 | None | 23.9 | 23.2 |
| 6 | Plastomer 1 | 60 | Propylene 2 | 35 | Tackifier 1 | 5 | 100 | None | 21.3 | 22.4 |
| 7 | Elastomer 1 | 50 | Propylene 2 | 50 | — | | 100 | None | 43.7 | 43.3 |
| 8 | Elastomer 2 | 50 | Propylene 2 | 50 | — | | 100 | None | 29.3 | 25.2 |
| 9 | Elastomer 1 | 50 | Propylene 1 | 50 | — | | 100 | None | 47.2 | 41.1 |
| 10 | Plastomer 1 | 75 | Propylene 2 | 25 | — | | 100 | Aperturing | 23.3 | 23.0 |
| 11 | Plastomer 1 | 75 | Propylene 2 | 25 | — | | 75 | Aperturing | 57.5 | 40.1 |
| 12 | Plastomer 1 | 60 | Propylene 2 | 35 | Tackifier 1 | 5 | 75 | Aperturing | 28.1 | 22.7 |
| 13 | Plastomer 1 | 60 | Propylene 2 | 35 | Tackifier 1 | 5 | 100 | Aperturing | 19.6 | 20.2 |
| 14 | Elastomer 1 | 50 | Propylene 2 | 50 | — | | 100 | Aperturing | 31.3 | 28.5 |
| 15 | Elastomer 2 | 50 | Propylene 2 | 50 | — | | 100 | Aperturing | 29.7 | 26.4 |
| 16 | Elastomer 1 | 50 | Propylene 1 | 50 | — | | 100 | Aperturing | 44.8 | 40.6 |
| 17 | Plastomer 1 | 50 | Propylene 1 | 45 | Tackifier 2 | 5 | 100 | Wire 1 | 51.6 | 49.0 |
| 18 | Plastomer 1 | 75 | Propylene 2 | 25 | — | | 100 | Wire 1 | 48.7 | 46.3 |
| 19 | Plastomer 1 | 50 | Propylene 1 | 50 | — | | 100 | Wire 1 | 40.4 | 38.5 |
| 20 | Plastomer 1 | 45 | Propylene 1 | 45 | Tackifier 2 | 10 | 100 | Wire 1 | 51.0 | 50.9 |
| 21 | Plastomer 1 | 45 | Propylene 1 | 45 | Tackifier 2 | 10 | 85 | Wire 1 | 66.6 | 55.5 |
| 22 | Plastomer 1 | 50 | Propylene 1 | 50 | — | | 85 | Wire 1 | 43.3 | 34.7 |
| 23 | Plastomer 1 | 50 | Propylene 1 | 45 | Tackifier 2 | 5 | 85 | Wire 1 | 69.5 | 55.2 |
| 24 | Plastomer 1 | 75 | Propylene 2 | 25 | — | | 85 | Wire 1 | 63.2 | 45.1 |
| 25 | Plastomer 1 | 45 | Propylene 1 | 45 | Tackifier 2 | 10 | 85 | Wire 1 | 42.7 | 33.9 |
| 26 | Plastomer 1 | 45 | Propylene 1 | 45 | Tackifier 2 | 10 | 85 | Wire 2 | 53.9 | 40.1 |
| 27 | Plastomer 1 | 45 | Propylene 1 | 45 | Tackifier 2 | 10 | 85 | Wire 3 | 36.7 | 26.9 |
| 28 | Plastomer 1 | 45 | Propylene 1 | 45 | Tackifier 2 | 10 | 85 | Wire 4 | 44.8 | 34.7 |

Propylene 1: Metocene MF650X

Propylene 2: Total 3962

Plastomer 1: Vistamaxx 2330

Thermoplstic Elastomer 1: Kraton MD6705

Thermoplastic Elastomer 2: Kraton MD6717

Tackifier 1: Regelrez

Tackifier 2: Oppera

As indicated above, samples 3-28 of the present invention exhibited improved dust holding capabilities compared to the control samples 1 and 2, which contained only propylene. Further, utilizing a forming wire to impart various textures to the nonwoven web material also improved its dust holding capacity, as did aperturing the material.

EXAMPLE 2

Spunbond nonwoven web material samples as shown in Table 2 below were prepared and then tested for their dust holding capacity as described in the method above. The samples were prepared by compounding components A and B (Side 1) separate from Components C and D (Side 2), after which Sides 1 and 2 were extruded to form a fiber having a side-by-side configuration. Thereafter, a spunbond web was formed for each sample.

TABLE 2

| | SIDE 1 | | | | SIDE 2 | | | | Basis | | Dust Holding |
| | Component A | | Component B | | Component C | | Component D | | Weight | Additional | Capacity |
| Sample | Polymer | Wt. % | Polymer | Wt. % | Polymer | Wt. % | Polymer | Wt. % | (gsm) | Processing | (g/m²) |
|---|---|---|---|---|---|---|---|---|---|---|---|
| 29 | PE 1 | 50 | INF | 50 | PP | 50 | VMX | 50 | 80 | None | 112.84 |
| 30 | PE 1 | 50 | INF | 50 | PP | 50 | VMX | 50 | 100 | None | — |
| 31 | PE 1 | 60 | INF | 40 | PP | 60 | VMX | 40 | 100 | None | — |

PP: Exxtral 3155
VMX: Vistamaxx 6202
PE 1: Dow 61800.41 Polyethylene
INF: Infuse 9807 Olefinic Block Copolymer As shown above in Table 2, a spunbond web formed from fibers having a side-by-side arrangement where side 1 included a polyethylene homopolymer and a polyethylene-based plastomer (e.g., INFUSE™ 9807) and side 2 included a polypropylene homopolymer and a polypropylene-based elastomer (e.g., VISTAMAXX™ 6202) had a dust holding capacity of over 100 g/m².

EXAMPLE 3

Spunbond nonwoven web material samples as shown in Table 3 below were prepared and then tested for their dust holding capacity as described in the method above. The samples were prepared by compounding Components A and B (sheath) separate from Components C and D (core), after which a fibers was extruded having a sheath-core configuration. Thereafter, a spunbond web was formed for each sample.

TABLE 3

| | Sheath | | | | Core | | | | Sheath | Basic | | Dust Holding |
| | Component A | | Component B | | Component C | | Component D | | to Core | Weight | Additional | Capacity |
| Sample | Polymer | Wt. % | Polymer | Wt. % | Polymer | Wt. % | Polymer | wt % | Ratio | (gsm) | Processing | (g/m²) |
|---|---|---|---|---|---|---|---|---|---|---|---|---|
| 32 | PP | 60 | VMX | 50 | PE 2 | 100 | — | — | 50/50 | 100 | None | — |
| 33 | PP | 60 | VMX | 40 | PE 2 | 100 | — | — | 50/50 | 100 | None | — |
| 34 | PP | 40 | VMX | 60 | PE 2 | 100 | — | — | 50/50 | 100 | None | — |
| 35 | PP | 40 | VMX | 60 | PE 2 | 100 | — | — | 25/75 | 100 | None | — |
| 36 | PE 2 | 60 | INF | 50 | PE 2 | 100 | — | — | 50/50 | 100 | None | — |
| 37 | PE 2 | 60 | INF | 40 | PE 2 | 100 | — | — | 50/50 | 100 | None | 94.9 |
| 38 | PP | 50 | VMX | 50 | PE 1 | 100 | — | — | 50/50 | 100 | None | 60.1 |
| 39 | PE 1 | 50 | INF | 50 | PP | 50 | VMX | 60 | 50/50 | 100 | None | — |
| 40 | PE 1 | 60 | INF | 40 | PP | 50 | VMX | 60 | 50/50 | 100 | None | — |
| 41 | PE 1 | 60 | INF | 40 | PP | 75 | VMX | 25 | 50/50 | 100 | None | 92.31 |

TABLE 3-continued

| | Sheath | | | | Core | | | Sheath to Core Ratio | Basic Weight (gsm) | Additional Processing | Dust Holding Capacity (g/m²) |
|---|---|---|---|---|---|---|---|---|---|---|---|
| | Component A | | Component B | | Component C | | Component D | | | | |
| Sample | Polymer | Wt. % | Polymer | Wt. % | Polymer | Wt. % | Polymer | wt % | Ratio | (gsm) | Processing | (g/m²) |
| 42 | PE 1 | 60 | INF | 40 | PP | 100 | — | — | 50/50 | 100 | None | — |
| 43 | PP | 40 | VMX | 60 | PP | 100 | — | — | 50/50 | 100 | None | — |
| 44 | PP | 40 | VMX | 60 | pp | 75 | VMX | 25 | 50/50 | 100 | None | — |

PP: Exxtral 3155
VMX: Vistamaxx 6202
PE 1: Dow 61800, 41 Polyethylene
PE 2: ASPUN 6850 (LLDPE)
INF: Infuse 9807 Olefinic Block Copolymer As shown above in Table 3, a spunbond web formed from multicomponent fibers having a sheath-core arrangement where the sheath and core were formed from various combinations of polypropylenes with polypropylene-based plastomers or polyethylenes with polyethylene-based plastomers had a dust holding capacity ranging from about 60 g/m² up to about 100 g/m². Further, in some embodiments, the core could be formed of an olefin polymer only (e.g., 100% polyethylene or 100% polypropylene).

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A tack cloth comprising a meltblown or spunbond nonwoven web material, the nonwoven web material comprising fibers, wherein the fibers comprise a first polymer present in an amount of 45 wt % based on the total weight of the nonwoven web material, a second polymer present in an amount of 45 wt % based on the total weight of the nonwoven web material, and a tackifier present in an amount of 10 wt % based on the total weight of the nonwoven web material, wherein the first polymer is an olefin homopolymer, the second polymer is an olefin-based plastomer having a glass transition temperature of less than about 25° C., and the tackifier comprises a hydrocarbon resin, a polyterpene resin, a terpene-phenol resin, or a combination thereof, wherein the second polymer is present in an amount equal to or greater than the amount of the first polymer based on the total weight of the nonwoven web material, wherein the difference between the amount of the second polymer and the amount of the first polymer is in a range from 0 wt % to 5 wt %, wherein the tackifier is compounded with the first polymer and the second polymer, wherein the nonwoven web material is textured to form a three-dimensional topography, wherein the nonwoven web material has a dust holding capacity of from about 10 grams/m² to about 130 grams/m², and wherein the amount of residue present on a surface wiped with the nonwoven web material ranges from about 0 grams/m² to about 0.02 grams/m², wherein the tack cloth is a wipe or a glove.

2. The tack cloth of claim 1, wherein the olefin-based plastomer comprises an ethylene/α-olefin copolymer, a propylene/α-olefin copolymer, or a combination thereof.

3. The tack cloth of claim 2, wherein the olefin-based plastomer comprises an olefinic block copolymer.

4. The tack cloth of claim 1, wherein the nonwoven web material is post-bonded.

5. The tack cloth of claim 1, wherein the nonwoven web material is treated with elemental fluorine gas.

6. The tack cloth of claim 1, wherein the nonwoven web material exhibits a lint potential of less than about 5 fibers/cm².

7. The tack cloth of claim 1, wherein the three-dimensional topography is formed by textured forming wires on a collecting surface that collects the fibers to form the nonwoven web material.

8. The tack cloth of claim 1, wherein the nonwoven web material is apertured.

* * * * *